(12) United States Patent
Boonzaier et al.

(10) Patent No.: US 12,440,291 B2
(45) Date of Patent: Oct. 14, 2025

(54) SYSTEMS AND METHODS FOR UNPOWERED RELEASE AND RETRACTION OF ROBOTIC TOOLS IN A ROBOTIC SURGICAL SYSTEM

(71) Applicant: Titan Medical Inc., Toronto (CA)

(72) Inventors: James Angus Boonzaier, Cape Town (ZA); Hans Christian Pflaumer, Apex, NC (US); Austin Paul Davis, Wendell, NC (US); Matthew Michael Marinovich, London (GB); Jozsef Horvath, Wake Forest, NC (US)

(73) Assignee: CONAVI MEDICAL INC., North York (CA)

( * ) Notice: Subject to any disclaimer, the term of this patent is extended or adjusted under 35 U.S.C. 154(b) by 126 days.

(21) Appl. No.: 18/529,567

(22) Filed: Dec. 5, 2023

(65) Prior Publication Data

US 2024/0206995 A1   Jun. 27, 2024

Related U.S. Application Data

(60) Provisional application No. 63/477,280, filed on Dec. 27, 2022.

(51) Int. Cl.
 *B25J 19/00*   (2006.01)
 *A61B 34/30*   (2016.01)

(52) U.S. Cl.
 CPC ........ *A61B 34/30* (2016.02); *A61B 2034/301* (2016.02); *A61B 2034/305* (2016.02); *A61B 2560/0266* (2013.01)

(58) Field of Classification Search
 CPC .............. A61B 34/30; A61B 2034/305; A61B 2034/301; A61B 2560/0266; B25J 9/0009; B25J 19/00; B25J 11/0015
 See application file for complete search history.

(56) References Cited

U.S. PATENT DOCUMENTS

| | | |
|---|---|---|
| 3,115,140 A | 12/1963 | Volkman |
| 3,196,875 A | 7/1965 | Pfeiffer |
| 3,227,290 A | 1/1966 | Lemelson |

(Continued)

FOREIGN PATENT DOCUMENTS

| | | |
|---|---|---|
| CA | 1239167 A | 7/1988 |
| CA | 2547686 | 8/1997 |

(Continued)

OTHER PUBLICATIONS

Hagn et al., Telemanipulator for remote minimally invasive surgery, 2008, IEEE, p. 1-11 (Year: 2008).*

(Continued)

*Primary Examiner* — McDieunel Marc
(74) *Attorney, Agent, or Firm* — Stephen Leonard; Aird & McBurney LP

(57) ABSTRACT

A robotic surgical system is provided with a central drive unit movably coupled to a robotic arm. The central drive unit includes telescoping assemblies, each facilitating movement of an instrument drive unit along a Z-axis (e.g., for moving surgical instruments into and out of the patient). An instrument (e.g., surgical tool, endoscope camera) is removably coupleable to each instrument drive unit. A manual brake release can be actuated to manually retract the instrument.

25 Claims, 27 Drawing Sheets

(56) References Cited

U.S. PATENT DOCUMENTS

| | | | |
|---|---|---|---|
| 3,922,930 A | 12/1975 | Fletcher | |
| 4,645,409 A | 2/1987 | Gorman | |
| 4,897,014 A | 1/1990 | Tietze | |
| 5,174,223 A | 12/1992 | Nagy et al. | |
| 5,201,742 A | 4/1993 | Hasson | |
| 5,224,429 A | 7/1993 | Borgman et al. | |
| 5,279,309 A | 1/1994 | Taylor | |
| 5,280,427 A | 1/1994 | Magnusson | |
| 5,347,997 A | 9/1994 | Weiler et al. | |
| 5,382,885 A | 1/1995 | Salcudean et al. | |
| 5,390,678 A | 2/1995 | Gesswein | |
| 5,403,332 A | 4/1995 | Christoudias | |
| 5,480,114 A | 1/1996 | Nakamura | |
| 5,553,198 A | 9/1996 | Wang et al. | |
| 5,605,311 A | 2/1997 | McGrath | |
| 5,665,095 A | 9/1997 | Jacobson | |
| 5,748,767 A | 5/1998 | Raab | |
| 5,749,362 A | 5/1998 | Funda et al. | |
| 5,827,323 A | 10/1998 | Klieman | |
| 5,891,020 A | 4/1999 | Luber et al. | |
| 6,132,368 A | 10/2000 | Cooper | |
| 6,245,028 B1 | 6/2001 | Furst et al. | |
| 6,264,665 B1 | 7/2001 | Yu et al. | |
| 6,299,625 B1 | 10/2001 | Bacher | |
| 6,471,172 B1 | 10/2002 | Lemke | |
| 6,491,701 B2 | 12/2002 | Tierney et al. | |
| 6,506,208 B2 | 1/2003 | Hunt | |
| 6,620,173 B2 | 9/2003 | Gerbi et al. | |
| 6,665,554 B1 | 12/2003 | Charles et al. | |
| 6,666,554 B2 | 12/2003 | Mulvey | |
| 6,673,092 B1 | 1/2004 | Bacher | |
| 6,685,698 B2 | 2/2004 | Morley et al. | |
| 6,699,177 B1 | 3/2004 | Wang et al. | |
| 6,793,653 B2 | 9/2004 | Sanchez et al. | |
| 7,048,745 B2 | 5/2006 | Tierney et al. | |
| 7,074,179 B2 | 7/2006 | Wang et al. | |
| 7,118,582 B1 | 10/2006 | Wang et al. | |
| 7,122,707 B2 | 10/2006 | Petzoldt et al. | |
| 7,206,626 B2 | 4/2007 | Quaid, III | |
| 7,331,967 B2 | 2/2008 | Lee et al. | |
| 7,419,080 B2 | 9/2008 | Smith et al. | |
| 7,428,491 B2 | 9/2008 | Wang et al. | |
| 7,540,867 B2 | 6/2009 | Jinno | |
| 7,608,083 B2 | 10/2009 | Lee et al. | |
| 7,666,191 B2 | 2/2010 | Orban, III et al. | |
| 7,695,481 B2 | 4/2010 | Wang et al. | |
| 7,867,241 B2 | 1/2011 | Brock et al. | |
| 7,914,521 B2 | 3/2011 | Wang et al. | |
| 7,918,826 B2 | 4/2011 | Armstrong et al. | |
| 7,942,895 B2 | 5/2011 | Jinno | |
| 7,963,913 B2 | 6/2011 | Devengenzo et al. | |
| 8,120,301 B2 | 2/2012 | Goldberg | |
| 8,142,447 B2 | 3/2012 | Cooper et al. | |
| 8,241,271 B2 | 8/2012 | Millman et al. | |
| 8,303,478 B2 | 11/2012 | Lebosse | |
| 8,638,057 B2 | 1/2014 | Goldberg et al. | |
| 8,649,905 B2 | 2/2014 | Ortmaier | |
| 8,920,433 B2 | 12/2014 | Barrier | |
| 8,939,500 B2 | 1/2015 | Voight | |
| 9,587,878 B2 | 3/2017 | Paydar | |
| 9,707,684 B2 | 7/2017 | Ruiz Morales | |
| 10,004,524 B2 | 6/2018 | Karcher | |
| 10,058,396 B1 | 8/2018 | Genova et al. | |
| 10,092,092 B2 | 10/2018 | Koch | |
| 10,126,720 B2 | 11/2018 | Liu | |
| 10,219,871 B2 | 3/2019 | Mirbagheri et al. | |
| 10,245,113 B1 | 4/2019 | Genova et al. | |
| 10,398,287 B1 | 9/2019 | Genova | |
| 10,398,521 B2 | 9/2019 | Itkowitz | |
| 10,426,561 B1 | 10/2019 | Kelly | |
| 10,471,607 B2 | 11/2019 | Butt et al. | |
| 10,617,479 B2 | 4/2020 | Itkowitz et al. | |
| 10,717,194 B2 | 7/2020 | Griffiths et al. | |
| 10,806,531 B2 | 10/2020 | Berry et al. | |
| 10,820,955 B2 | 11/2020 | Lutzow et al. | |
| 10,939,970 B2 | 3/2021 | Laakso et al. | |
| 11,007,029 B2 | 5/2021 | Lutzow et al. | |
| 11,259,881 B2 | 3/2022 | Kilroy et al. | |
| 11,571,820 B2 | 2/2023 | Butt et al. | |
| 11,653,986 B2 | 5/2023 | Laakso et al. | |
| 11,872,694 B2 | 1/2024 | Butt et al. | |
| 12,089,905 B1 * | 9/2024 | Roh | A61B 34/32 |
| 12,269,163 B1 * | 4/2025 | Brubaker | A61B 34/37 |
| 2002/0007188 A1 | 1/2002 | Arambula et al. | |
| 2002/0074463 A1 | 6/2002 | Nakamura | |
| 2003/0229338 A1 | 12/2003 | Irion et al. | |
| 2004/0009459 A1 | 1/2004 | Anderson et al. | |
| 2004/0037390 A1 | 2/2004 | Mihara | |
| 2004/0111183 A1 | 6/2004 | Sutherland | |
| 2004/0184579 A1 | 9/2004 | Mihara | |
| 2005/0080333 A1 | 4/2005 | Piron et al. | |
| 2005/0251156 A1 * | 11/2005 | Toth | G16H 40/40 |
| | | | 606/153 |
| 2006/0050239 A1 | 3/2006 | Hashimoto | |
| 2006/0161039 A1 | 7/2006 | Juliana et al. | |
| 2006/0161136 A1 | 7/2006 | Anderson et al. | |
| 2006/0235436 A1 | 10/2006 | Anderson et al. | |
| 2006/0243085 A1 | 11/2006 | Hannaford | |
| 2007/0088340 A1 | 4/2007 | Brock et al. | |
| 2007/0156122 A1 | 7/2007 | Cooper | |
| 2007/0205785 A1 | 9/2007 | Nilsson | |
| 2007/0208375 A1 | 9/2007 | Nishizawa et al. | |
| 2008/0004633 A1 | 1/2008 | Arata | |
| 2008/0019607 A1 | 1/2008 | Star-Lack et al. | |
| 2008/0033410 A1 | 2/2008 | Rastegar et al. | |
| 2008/0147089 A1 | 6/2008 | Loh et al. | |
| 2008/0177173 A1 | 7/2008 | Deffenbaugh | |
| 2008/0213077 A1 | 9/2008 | Tanaka et al. | |
| 2008/0232932 A1 | 9/2008 | Jinno | |
| 2009/0041565 A1 | 2/2009 | Rodriguez | |
| 2009/0095790 A1 | 4/2009 | Whitman | |
| 2009/0101692 A1 | 4/2009 | Whitman | |
| 2009/0171185 A1 | 7/2009 | Chou et al. | |
| 2009/0234444 A1 | 9/2009 | Maschke | |
| 2009/0248039 A1 | 10/2009 | Cooper et al. | |
| 2009/0312600 A1 | 12/2009 | Sholev | |
| 2009/0326555 A1 | 12/2009 | Vohra | |
| 2010/0042142 A1 | 2/2010 | Cunningham | |
| 2010/0069920 A1 | 3/2010 | Naylor | |
| 2010/0185211 A1 | 7/2010 | Herman | |
| 2010/0204713 A1 | 8/2010 | Ruiz Morales | |
| 2010/0225209 A1 | 9/2010 | Goldberg | |
| 2010/0249501 A1 | 9/2010 | Matsuno | |
| 2010/0268249 A1 | 10/2010 | Stuart | |
| 2011/0040304 A1 | 2/2011 | Li | |
| 2011/0071543 A1 | 3/2011 | Prisco et al. | |
| 2011/0120351 A1 | 5/2011 | Shoenfeld | |
| 2011/0152881 A1 | 6/2011 | Conner | |
| 2011/0174860 A1 | 7/2011 | Shelton, IV et al. | |
| 2011/0277775 A1 | 11/2011 | Holop et al. | |
| 2011/0301754 A1 * | 12/2011 | Toth | A61B 34/30 |
| | | | 901/41 |
| 2012/0083801 A1 * | 4/2012 | Nixon | B25J 9/1692 |
| | | | 700/254 |
| 2012/0085267 A1 | 4/2012 | Kenny | |
| 2012/0150154 A1 | 6/2012 | Brisson | |
| 2012/0234893 A1 | 9/2012 | Schuckmann | |
| 2013/0053866 A1 | 2/2013 | Leung et al. | |
| 2013/0099072 A1 | 4/2013 | Buller et al. | |
| 2013/0199540 A1 | 8/2013 | Buske | |
| 2014/0096706 A1 | 4/2014 | Labrosse | |
| 2014/0188131 A1 * | 7/2014 | Toth | A61B 34/32 |
| | | | 901/41 |
| 2014/0230595 A1 | 8/2014 | Butt et al. | |
| 2014/0243849 A1 | 8/2014 | Saglam et al. | |
| 2014/0249546 A1 | 9/2014 | Shvartsberg et al. | |
| 2014/0276931 A1 | 9/2014 | Parihar | |
| 2014/0330434 A1 * | 11/2014 | Nixon | A61B 34/70 |
| | | | 700/254 |
| 2016/0073978 A1 | 3/2016 | Henderson | |
| 2016/0143633 A1 | 5/2016 | Robert et al. | |
| 2016/0303745 A1 | 10/2016 | Rockrohr | |
| 2017/0065477 A1 | 3/2017 | Jagger | |
| 2017/0151013 A1 | 6/2017 | Kappus | |

(56) References Cited

U.S. PATENT DOCUMENTS

| | | |
|---|---|---|
| 2017/0312047 A1 | 11/2017 | Swarup et al. |
| 2018/0147106 A1 | 5/2018 | Soundararajan |
| 2018/0256259 A1 | 9/2018 | Crawford |
| 2018/0353245 A1 | 12/2018 | McCloud et al. |
| 2018/0353254 A1 | 12/2018 | Lutzow et al. |
| 2019/0060029 A1 | 2/2019 | Kralicky |
| 2019/0082931 A1 | 3/2019 | Andrews et al. |
| 2019/0187741 A1 | 6/2019 | Walters et al. |
| 2019/0274530 A1 | 9/2019 | Ushiroda |
| 2019/0357990 A1 | 11/2019 | Lutzow et al. |
| 2020/0188050 A1 | 6/2020 | Pennoyer et al. |
| 2020/0289236 A1 | 9/2020 | Shvartsberg et al. |
| 2021/0196408 A1 | 7/2021 | Hoffman et al. |
| 2021/0228290 A1 | 7/2021 | Laakso et al. |
| 2021/0236222 A1 | 8/2021 | Lutzow et al. |
| 2021/0330407 A1 | 10/2021 | Chassot et al. |
| 2023/0055386 A1 | 2/2023 | Laakso et al. |
| 2023/0090057 A1 | 3/2023 | Shvartsberg et al. |

FOREIGN PATENT DOCUMENTS

| | | |
|---|---|---|
| CA | 2222150 C | 9/2008 |
| CN | 108272509 A | 7/2018 |
| CN | 111345894 A | 6/2020 |
| CN | 211460507 U | 9/2020 |
| CN | 113952035 A | 1/2021 |
| CN | 111 374 777 A | 7/2022 |
| EP | 1886633 A2 | 2/2008 |
| EP | 2366342 A1 | 9/2011 |
| EP | 3 238 650 A1 | 11/2017 |
| EP | 3 281 752 A1 | 2/2018 |
| EP | 3 520 729 A1 | 8/2019 |
| GB | 2239605 A | 7/1991 |
| JP | 2003 079638 A | 3/2003 |
| JP | 20078017903 A | 1/2008 |
| SU | 1299676 A1 | 3/1987 |
| WO | WO 98/25666 A1 | 6/1998 |
| WO | WO 00/30548 A1 | 6/2000 |
| WO | WO 2004070400 A1 | 8/2004 |
| WO | WO 2007/133065 A1 | 11/2007 |
| WO | WO 2009157719 A2 | 12/2009 |
| WO | WO 2010/002544 A1 | 1/2010 |
| WO | WO 2010/068005 A2 | 6/2010 |
| WO | WO 2010/090292 A2 | 8/2010 |
| WO | WO 2011/013103 | 2/2011 |
| WO | WO 2011/122862 A2 | 10/2011 |
| WO | WO 2016/069661 A1 | 5/2016 |

OTHER PUBLICATIONS

Sophocleous et al., Development and initial testing of a prototype concentric tube robot for surgical interventions, 2012, IEEE, p. 227-232 (Year: 2012).*

Wang et al., Design, Analysis, and Evaluation of a Remotely Actuated MRI-Compatible Neurosurgical Robot, 2018, IEEE, p. 2144-212151 (Year: 2018).*

Rose et al., Hybrid Rigid-Soft Hand Exoskeleton to Assist Functional Dexterity, 2018, IEEE, p. 73-80 (Year: 2018).*

Zorn et al., A Novel Telemanipulated Robotic Assistant for Surgical Endoscopy: Preclinical Application to ESD, 2017, IEEE, pp. 797-808 (Year: 2017).*

Zhong et al., Foot-Controlled Robot-Enabled EnDOscope Manipulator (FREEDOM) for Sinus Surgery: Design, Control, and Evaluation, 2019, IEEE, pp. 1530-1541 (Year: 2019).*

Direkwatana et al., Development of wire-driven laparoscopic surgical robotic system, "MU-LapaRobot" 2011, IEEE, pp. 485-490 (Year: 2011).*

Shang et al., A Single-Port Robotic System for Transanal Microsurgery-Design and Validation, 2017, IEEE, pp. 1510-1517 (Year: 2017).*

* cited by examiner

SYSTEMS AND METHODS FOR UNPOWERED RELEASE AND RETRACTION OF ROBOTIC TOOLS IN A ROBOTIC SURGICAL SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure generally relates to robotic surgical systems, and more particularly to mechanisms for mechanically releasing and retracting robotic tools of a robotic surgical system.

Description of the Related Art

Robotic surgery systems generally include an operator interface that receives operator input from a surgeon and causes corresponding movements of surgical tools within a body cavity of a patient to perform a surgical procedure. The operator interface can be on a workstation that the surgeon interfaces with to perform a surgical procedure using the surgical tools. The surgical tools can be on a cart separate from the workstation. The cart can be mobile, allowing hospital staff to move the cart into an operating room prior to the surgical procedure, and to remove it from the operating room once the surgical procedure has been completed.

SUMMARY

In accordance with one aspect of the disclosure, a brake release mechanism is provided for manually releasing a brake to allow manual retraction of a robotic tool of a surgical robotic system, such as when the system experiences a loss of power or hardware or software malfunction.

In some aspects, the techniques described herein relate to a robotic surgical system, including: a central drive unit configured to movably couple to a robotic arm, the central drive unit including: a linear spar attached to a mounting plate and extending distally from the mounting plate along a first axis, and a telescoping assembly movable relative to the linear spar, including an intermediate link movably coupled to the linear spar and configured to move linearly relative to the linear spar, the intermediate link being actuatable by a lead screw to extend distally relative to the linear spar, and an instrument drive unit movably coupled to the intermediate link and configured to move linearly relative to the intermediate link, the instrument drive unit configured to extend distally relative to the intermediate link, the instrument drive unit having a distal interface configured to removably couple to a robotic tool, wherein the telescoping assembly is actuatable between a collapsed configuration where the instrument drive unit is in a retracted position relative to the intermediate link and the intermediate link is in a retracted position relative to the linear spar and an extended configuration where the instrument drive unit is in an extended position relative to the intermediate link and the intermediate link is in an extended position relative to the linear spar; an electric motor operatively coupled to the lead screw and operable to rotate the lead screw to extend the intermediate link relative to the linear spar; a brake operable to inhibit rotation of the lead screw to lock a movement of one or more of the intermediate link and the instrument drive unit; and a manual brake release mechanism manually operable by a user to disengage the brake to allow manual retraction of the telescoping assembly to the collapsed configuration to manually retract the robotic tool.

In some aspects, the techniques described herein relate to a system, wherein the lead screw is back-drivable.

In some aspects, the techniques described herein relate to a system, wherein the brake includes an armature and a friction disc, the armature configured to engage the friction disc to engage the brake.

In some aspects, the techniques described herein relate to a system, wherein the brake release mechanism includes a plate disposed between at least a portion of the armature and the friction disc, the plate linearly actuatable to separate the armature from the friction disc to disengage the brake to thereby allow the manual retraction of the telescoping assembly to the collapsed configuration to manually retract the robotic tool.

In some aspects, the techniques described herein relate to a system, wherein the plate is actuatable by a lever pivotally or rotatably coupled to a housing of the central drive unit.

In some aspects, the techniques described herein relate to a system, wherein the lever is configured to be pivoted away from the housing of the central drive unit to actuate the plate via one or more rods to separate the armature from the friction disc to disengage the brake.

In some aspects, the techniques described herein relate to a system, wherein the lever is configured to be pivoted toward the housing of the central drive unit to actuate the plate via one or more rods to separate the armature from the friction disc to disengage the brake.

In some aspects, the techniques described herein relate to a system, wherein the lever is configured to be rotated along a surface of the housing of the central drive unit to actuate the plate via one or more rods to separate the armature from the friction disc to disengage the brake.

In some aspects, the techniques described herein relate to a system, further including means for separating the armature from the friction disc to disengage the brake.

In some aspects, the techniques described herein relate to a system, wherein the brake release mechanism includes a torque arm with a pair of spacers disposed between at least a portion of the armature and the friction disc, the pair of spacers having a rectangular profile with a greater width than height, the torque arm pivotally actuatable about an axis between the spacers to separate the armature from the friction disc to disengage the brake to thereby allow the manual retraction of the telescoping assembly to the collapsed configuration to manually retract the robotic tool.

In some aspects, the techniques described herein relate to a system, wherein the torque arm is pivoted via a lever pivotally coupled to a housing of the central drive unit, the lever coupled to the torque arm via a connector arm.

In some aspects, the techniques described herein relate to a system, wherein the lever is configured to be pressed or pivoted toward the housing to pivot the torque arm to separate the armature from the friction disc to disengage the brake.

In some aspects, the techniques described herein relate to a system, wherein the lever is configured to be pivoted away from a surface of the housing or pinched relative to a second surface of the housing to pivot the torque arm to separate the armature from the friction disc to disengage the brake.

In some aspects, the techniques described herein relate to a system, further including means for separating the armature from the friction disc to disengage the brake.

In some aspects, the techniques described herein relate to a system, wherein the manual brake release mechanism is at least housed in the instrument drive unit.

In some aspects, the techniques described herein relate to a system, wherein the intermediate link has a plurality of teeth, and wherein the brake includes a magnetic solenoid with a shaft that engages rotatable cam with a tooth, the tooth selectively engaging one of the teeth of the intermediate link to lock the instrument drive unit relative to the intermediate link when the system experiences a loss of power.

In some aspects, the techniques described herein relate to a system, wherein the brake release mechanism includes a brake release actuator manually actuatable by a user to apply a force on the shaft of the magnetic solenoid to retract the tooth from engagement with the teeth to disengage the brake and allow retraction of the instrument drive unit relative to the intermediate link to move the telescoping assembly to the collapsed configuration.

In some aspects, the techniques described herein relate to a system, wherein the brake includes a magnetic solenoid with a shaft that engages rotatable cam with a wiper, the wiper selectively frictionally engaging a surface of the intermediate link to lock the instrument drive unit relative to the intermediate link when the system experiences a loss of power.

In some aspects, the techniques described herein relate to a system, wherein the brake release mechanism includes a brake release actuator manually actuatable by a user to apply a force on the shaft of the magnetic solenoid to retract the wiper from engagement with the surface to disengage the brake and allow retraction of the instrument drive unit relative to the intermediate link to move the telescoping assembly to the collapsed configuration.

In some aspects, the techniques described herein relate to a system, wherein the instrument drive unit includes the brake that frictionally engages one of both sides of a rail of the intermediate, the brake release mechanism including a brake release actuator manually actuatable by a user to disengage the brake and allow retraction of the instrument drive unit relative to the intermediate link to move the telescoping assembly to the collapsed configuration.

In some aspects, the techniques described herein relate to a system, wherein the lead screw has a ratcheted surface, and wherein the brake includes a magnetic solenoid with a shaft having a tooth that engages the ratcheted surface of the lead screw to lock a position of the telescoping assembly when the system experiences a loss of power.

In some aspects, the techniques described herein relate to a system, wherein the brake release mechanism includes a brake release actuator manually actuatable by a user to apply a force on the shaft of the magnetic solenoid to retract the tooth from engagement with the ratcheted surface to disengage the brake and allow manual retraction of the telescoping assembly to the collapsed configuration.

In some aspects, the techniques described herein relate to a system, further including a belt forming a closed loop belt extending over a pair of rollers attached to the intermediate link, a first portion of the belt fixedly coupled to a first clamp of the linear spar and a second portion of the belt fixedly coupled to a second clamp of the instrument drive unit, wherein movement of the intermediate link relative to the linear spar causes the belt to move about the pair of rollers, thereby causing the instrument drive unit to linearly move relative to the linear spar.

In some aspects, the techniques described herein relate to a system, wherein the brake release mechanism is configured to release the second clamp from the belt to allow the instrument drive unit to move relative to the intermediate link.

In some aspects, the techniques described herein relate to a system, further including a sterile adapter configured to removably couple to the distal interface of the instrument drive unit, one or more drive dogs at the distal interface configured to engage one or more driven dogs of the sterile adapter to transfer motion to a robotic tool coupled to the sterile adapter, a tool release mechanism including a plate linearly actuatable to separate the drive dogs from the driven dogs while the sterile adapter is coupled to the distal interface to decouple the drive dogs from the robotic tool to allow a manual straightening of the robotic tool.

BRIEF DESCRIPTION OF THE DRAWINGS

FIGS. 6A-6F show another example unpowered release mechanism for a robotic tool of the robotic surgical system.

DETAILED DESCRIPTION

Robotic Surgical System

Figure 1:
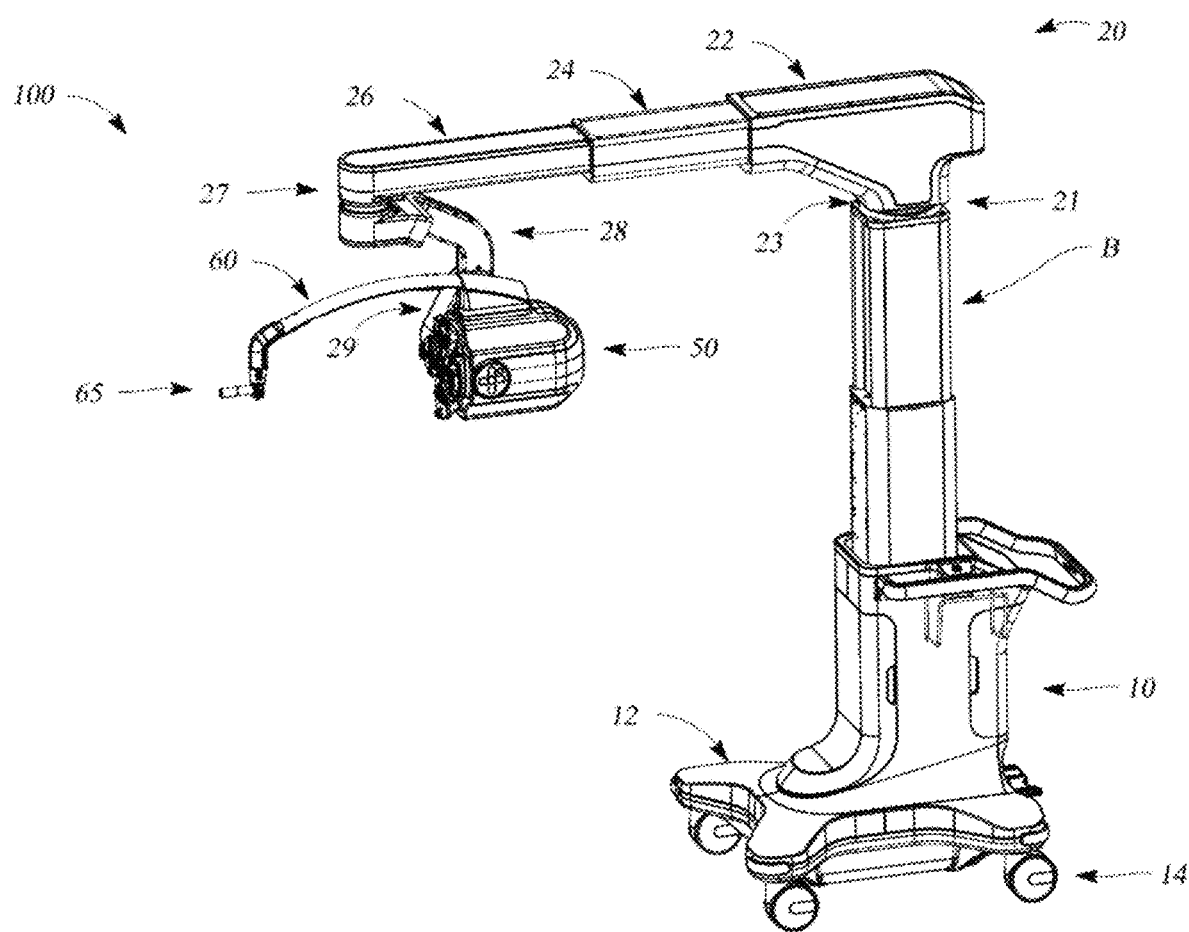
FIG. 1 is a perspective view of a robotic surgical system in an example deployed configuration.

FIG. 1 shows a robotic surgical system 100. The robotic surgical system 100 includes a cart 10 (e.g., patient cart) with a base 12. The base 12 has one or more wheels 14 that allow the cart 10 (e.g., tower) to move along a surface (e.g., floor of the operating room). The wheels 14 can be selectively locked and unlocked. The system also includes an arm assembly 20 that is movably coupled to the cart 10. The arm assembly 20 is a robotic (e.g., electromechanically controlled) arm assembly. A central drive unit (CDU) 50 is movably coupled to the arm assembly 20. One or more robotic surgical tools (described further below) can be removably coupled to the central drive unit 50, which can extend at least a portion of the robotic surgical tools through a cannula or insertion tube 65 attached to a support arm 60 mechanically coupled (e.g., fixed to) the central drive unit 50 into a surgical space in a patient and operate end effectors of the robotic surgical tools to perform a surgical procedure within the surgical space.

In the illustrated implementation, the arm assembly 20 is a prismatic boom arm (e.g., a multi-stage prismatic boom arm) assembly. The arm assembly 20 has a first arm section 22 movably (e.g., rotatably, pivotally) coupled to a boom arm (e.g., pillar) B via a joint 23 (e.g., first rotatable joint). The boom arm B is movably attached to the cart 10 (e.g., to a top side of the cart 10) so that the boom arm B can move relative to the cart 10 to adjust a height of the arm assembly 20 relative to the base 12 to vary a vertical position (e.g., in the Z direction) of the arm assembly 20. The arm assembly 20 can include a second arm section 24 movably coupled to the first arm section 22 in a telescoping manner (e.g., at least a portion of the second arm section 24 extends from within the first arm section 22). The arm assembly 20 can include a third arm section 26 movably coupled to the second arm section 24 in a telescoping manner (e.g., at least a portion of the third arm section 26 extends from within the second arm section 24). A fourth arm section 28 can be movably coupled to the third arm section 26 at an opposite end thereof via a joint 27 (second rotatable joint or yaw joint) from the second arm section 26. The central drive unit 50 can be movably (e.g., rotatably, pivotally) coupled to the fourth arm section 28 via a joint 29 (e.g., third rotatable joint or pitch joint). The first, second and third arm sections 22, 24, 26 can generally extend along the same axis, and can extend generally perpendicular to an axis of the boom arm B (e.g., extend generally horizontal or parallel to a support surface on which the base 12 sits). In another implementation, the arm assembly 20 can have two telescoping arm sections (instead of three) between the proximal portion 21 and the fourth arm section 28. In still another implementation, the arm assembly 20 can have more than three telescoping arm sections (e.g., four, five). Advantageously, the fourth arm section 28 or support arm for the central drive unit 50 is shaped to allow the robotic surgical system 100 to stow in a compact position.

The arm assembly 20 includes electric motors, brakes and/or encoders for rotational motion of the arm assembly 20 (e.g., first arm section 22) relative to the boom arm B and for proximal-distal translation of the first, second and third arm sections 22, 24, 26. In one implementation, the arm assembly 20 can include a linear drive. For example, the linear drive can be a 1.5 Nm stepper motor that powers a timing belt drive. In other implementations the linear drive can have other configurations. In one implementation, one or more (e.g., all) of the joints 23, 27, 29 (e.g., first rotatable joint, second rotatable joint or yaw joint, and third rotatable joint or pitch joint) can include a robotic drive system for maintaining or adjusting the pitch and yaw of the central drive unit 50. Drive units for effecting pitch and/or yaw motion can include a harmonic drive, a planetary gearbox, belt drives, cable and pulley drives and worm and wheel drives. Drive units for effecting the horizontal (proximal-distal) motion of the arm assembly 20 can include belt drives, rack and pinions, lead screws, cables and pulleys and linear actuators.

With continued reference to FIG. 1, the cart 10 can include one or more electric motors, drive units, transmissions brakes and/or encoders to effect a vertical motion of the boom arm B relative to the base 12. In one implementation, the base 12 can have 1:1 wheel aspect ratio that inhibits (e.g., prevents) tip-over of the cart 10 through the full range of motion of the arm assembly 20.

Advantageously, the arm assembly 20 is horizontally constrained. Apart from the vertical adjustment of the arm assembly 20 and the pitch joint (joint 29), the degrees of freedom are naturally balancing. For example, first, second and third arm sections 22, 24, 26 extend linearly (e.g., horizontally or transverse to an axis of the cart 10) and move only horizontally (e.g., relative to each other). The first, second and third arm sections 22, 24, and 26 can move relative to each other between an extended configuration (shown in FIG. 1) and a collapsed or retracted or stowed configuration. Each of the joints 23, 27, and 29 can be robotic (e.g., electromechanically controlled), as discussed further below. The joint 27 (e.g., second rotatable joint) effects a yaw movement of the central drive unit 50, and the joint 29 (e.g., third rotatable joint) effects a pitch movement of the central drive unit 50. The arm assembly 20 can be operated to control the horizontal (e.g., proximal-distal) translation of the central drive unit 50. In the illustrated embodiment, the surgical system 100 has five degrees of freedom provided by the vertical motion of the boom arm B, the horizontal motion of the first, second and third arm sections 22, 24, 26 and the three joints 23, 27, 29 (e.g., excluding any degrees of freedom in the robotic surgical tools that are coupled to the central drive unit 50).

Figure 2:
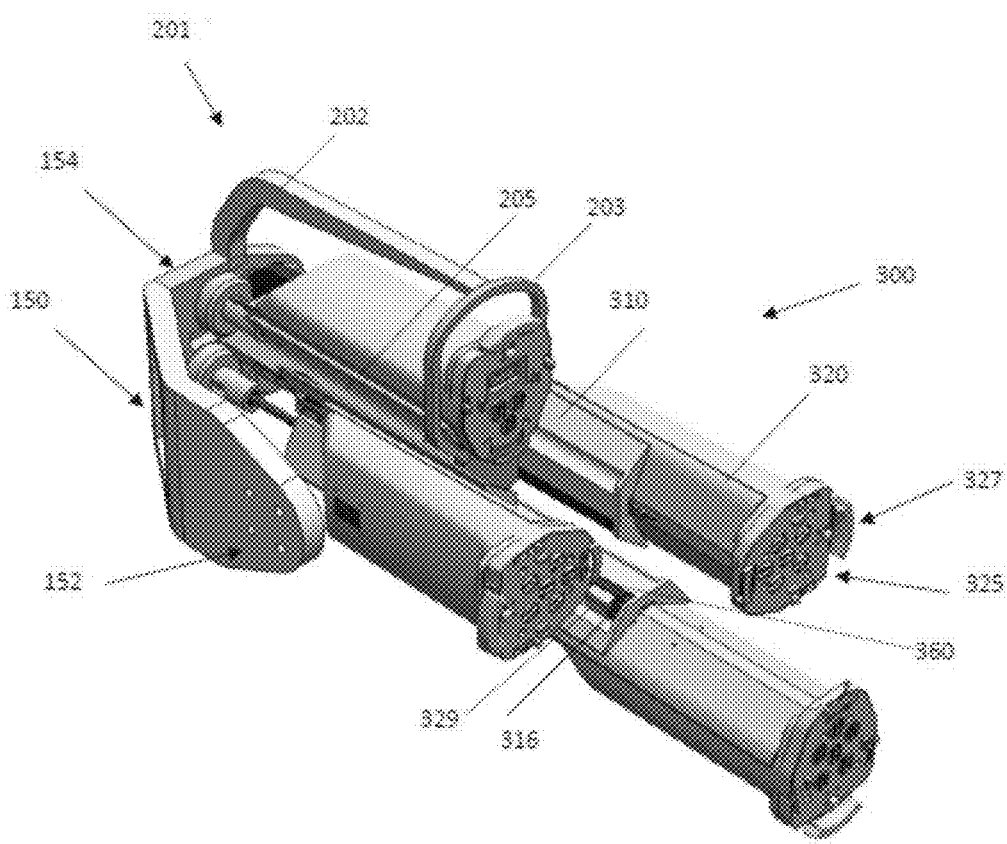
FIG. 2 is a perspective view of a portion of a central drive unit of a robotic surgical system.
Figure 3:
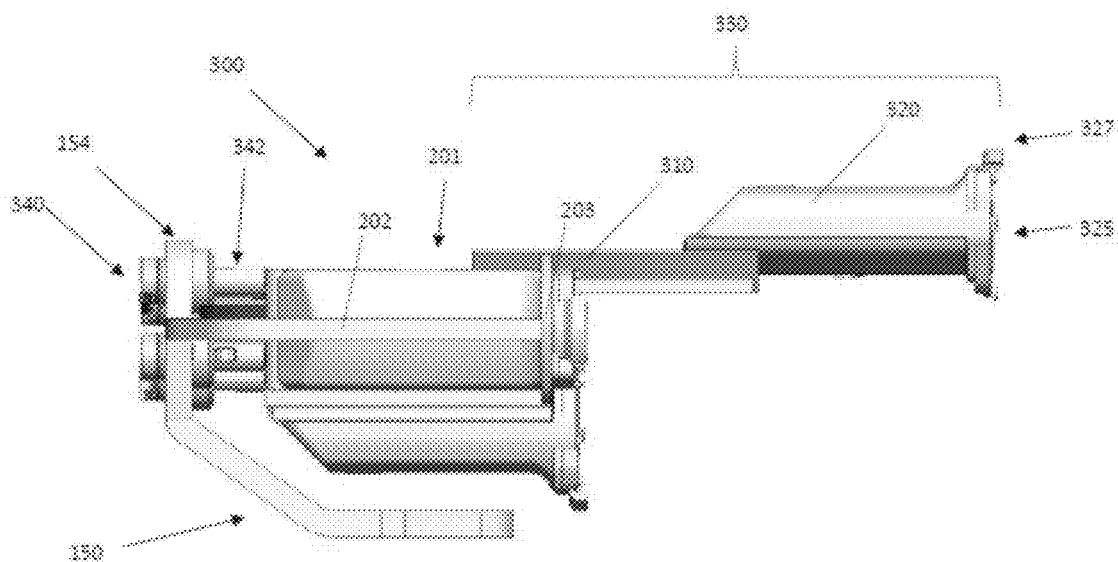
FIG. 3 is a side view of the portion of the central drive unit of FIG. 2.

FIGS. 2-3 illustrate features of instrument drive assemblies 300 of the central drive unit 50. For clarity, the outer casing, as well as other electronics of the central drive unit 50 are not shown. A spar 205 (e.g., linear spar) is attached to a bracket 150 (e.g., to a second mount 154) and extends therefrom. One or more (e.g., multiple) rails are coupled to the spar 205. In one implementation, the spar 205 has a generally cross shaped transverse cross-section. The central drive unit 50 can include a chassis 201. The chassis 201 can include a support beam 202 and bracket 203. In one implementation, the bracket 150 can be part of the chassis 201 of the central drive unit 50. The support beam 202 can be attached to the bracket 150 (e.g., attached to the second mount 154) and extend in the same direction as the spar 205. The bracket 203 can extend between and attach to the support beam 202 (e.g., to a distal end of the support beam 202) and to the spar 205 (e.g., to a distal end of the spar 205). The bracket 203 has an opening sized to allow one of the instrument drive assemblies 300 to extend therethrough. Though FIG. 2 only shows one support beam 202 and bracket 203, the central drive unit 50 can have more than one support beam 202 and bracket 203 that couple to the spar 205, with an instrument drive assembly 300 extending through the opening in each bracket 203. The support beam 202 and bracket 203 can provide structural support (e.g., rigidity) to the spar 205. As shown in FIG. 2, multiple instrument drive assemblies 300 (e.g., four instrument drive assemblies 300) can be movably coupled to the spar 205 and arranged about the spar 205 (e.g., at approximately 90 degrees relative to teach other).

Each of the instrument drive assemblies 300 includes an intermediate link 310 movably coupled to the spar 205 and an instrument drive unit 320 movably coupled to the intermediate link 310. The intermediate link 310 can linearly move relative to the spar 205 between a retracted position and an extended position. The instrument drive unit 320 can linearly move relative to the intermediate link 310 between a retracted position and an extended position. The intermediate link 310 and instrument drive unit 320 therefore provide a telescoping assembly 330 of the instrument drive assembly 300 that can be actuated between a collapsed position and an extended position. In FIG. 3, one of the instrument drive assemblies 300 is shown in an extended position and the rest of the instrument drive assemblies 300 are shown in the collapsed position.

The instrument drive unit 320 has a distal interface 325 (e.g., at a distal end of the instrument drive unit 320) via which the surgical tool 400 couples to the instrument drive unit 320 and via which the instrument drive unit 320 actuates an end effector of the surgical tool 400 (e.g., to provide, roll, pitch and/or yaw motion to the end effector, to open and close jaws of the end effector, etc.). The instrument drive unit 320 also has a latch 327 actuatable to decouple the surgical tool 400 from the instrument drive unit 320.

Figure 3A:
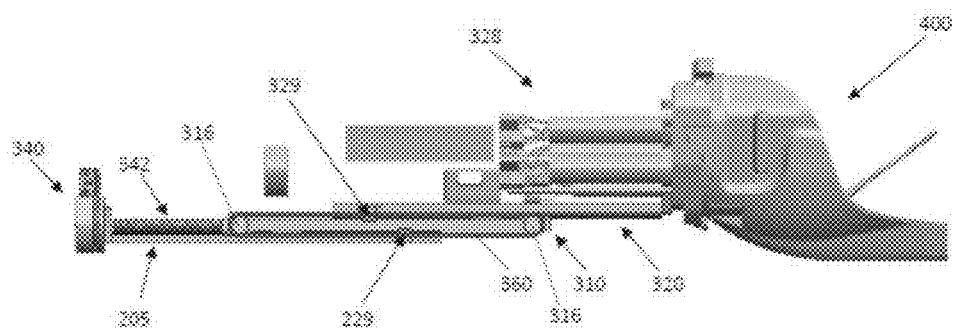
FIG. 3A is a side view of a portion of an instrument drive unit (IDU) of a central drive unit, and a surgical tool attached to the IDU.

With reference to FIG. 3A, the intermediate link 310 has two rollers 316 located at two different locations (e.g., at opposite ends) of the intermediate link 310. The two rollers 316 can rotate about an axis perpendicular to the length of the intermediate link 310. A belt 360 is disposed about the two rollers 316 and forms a closed loop. The belt 360 can move over the two rollers 316. The spar 205 has a clamp 229 that clamps (e.g., is fixedly coupled) to the belt 360 at one location. The instrument drive unit 320 has a clamp 329 that clamps (e.g., is fixedly coupled) to the belt 360 at a different location. Because the spar 205 is coupled to the belt 360 via the clamp 229, and because the instrument drive unit 320 is coupled to the belt 360 via the clamp 329, motion of the belt 360 over the two rollers 316 moves the instrument drive unit 320 relative to the spar 205. In particular, linear motion of the intermediate link 310 relative to the spar 205 (e.g., via rotation of the lead screw 342 by the motor 340) causes movement of the belt 360 over the two rollers 316, which causes linear motion of the instrument drive unit 320 (e.g., via the linear movement of the clamp 329 coupled to the belt 360 relative to the intermediate link 310). Therefore, rotation of the lead screw 342 by the motor 340 to linearly move the intermediate link 310 relative to the spar 205 away from the second mount 154 (e.g., mounting plate) automatically causes the instrument drive unit 320 to linearly move distally relative to the intermediate link 310 (e.g., away from a proximal end of the intermediate link 310 closest to the second mount 154). Similarly, rotation of the lead screw 342 by the motor 340 to linearly move the intermediate link 310 relative to the spar 205 toward the second mount 154 (e.g., mounting plate) automatically causes the instrument drive unit 320 to linearly move proximally relative to the intermediate link 310 (e.g., toward a proximal end of the intermediate link 310 closest to the second mount 154). Therefore, the belt 360, two rollers 316, clamp 229 and clamp 329 provide a transmission between intermediate link 310 and the instrument drive unit 320.

With reference to FIGS. 2-3A, the instrument drive unit 320 includes electronics 328 that operate transmission elements on the distal interface 325 of the instrument drive unit 320. The transmission elements can releasably engage corresponding actuators (not shown) of the surgical tool 400 when the surgical tool 400 is coupled to the instrument drive unit 320 and actuate one or more motions of the end effector of the surgical tool 400.

Figure 4:
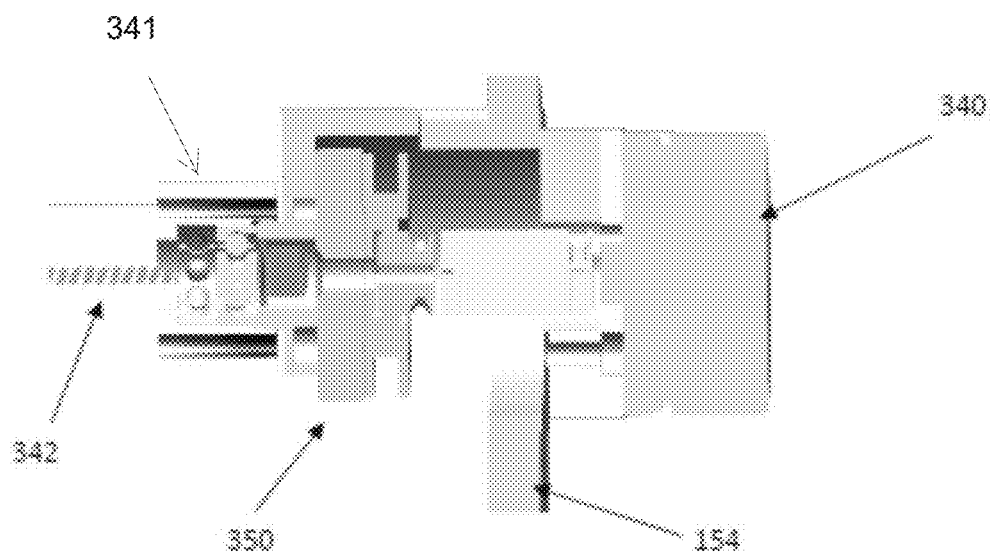
FIG. 4 is a cross-sectional side view of a portion of an instrument drive unit (IDU).

As shown in FIG. 4, each of the instrument drive assemblies 300 includes a brake 350 (e.g., between the motor 340 and the lead screw 342). The brake 350 can be selectively engaged to inhibit (e.g., prevent) rotation of the lead screw 342 via the lead screw connector 341 and disengaged to allow or permit rotation of the lead screw 342 (e.g., by the motor 340 via the lead screw connector 341). In one implementation, the brake 350 is automatically engaged when the robotic surgical system 100 suffers a loss of power or hardware malfunction or software malfunction to inhibit (e.g., prevent) movement of the surgical tools 400. Advantageously, the brake 350 can be manually disengaged (e.g., by a lever, button) to allow the back driving of the lead screw 342, such as to move the instrument drive assemblies 300 to the collapsed configuration (e.g., during a loss of power or malfunction of the surgical tool 400 or instrument drive unit 320). For example, once the brake 350 is manually disengaged, the user can manually push on the instrument drive unit 320 to move it toward the second mount 154 (e.g., mounting plate) to move the instrument drive assemblies 300 to the collapsed configuration. In one implementation, the manual disengagement of the brake 350 can require that the actuator (e.g., lever, button) continue to be manually actuated (e.g., a Deadman actuator) for the brake 350 to remain disengaged and allow manual movement of the instrument drive assemblies 300.

Unpowered Release and Retraction

Described below are unpowered (e.g., mechanical) brake release mechanisms operable (by a user) to release (e.g., disengage) the brake 350 of its associated instrument drive assembly 300 to thereby allow the robotic tool (e.g., surgical tool) to be manually retracted (e.g., withdrawn from a surgical site within a patient). Such brake release mechanisms advantageously allow the (manual) retraction of robotic tools (e.g., surgical tools) of the robotic surgical system 100, for example, when there is a loss of power, hardware malfunction or software malfunction (e.g., software bug or glitch) that prevents the powered (e.g., electrically driven) retraction of the robotic tools.

Figures 5A, 5B:
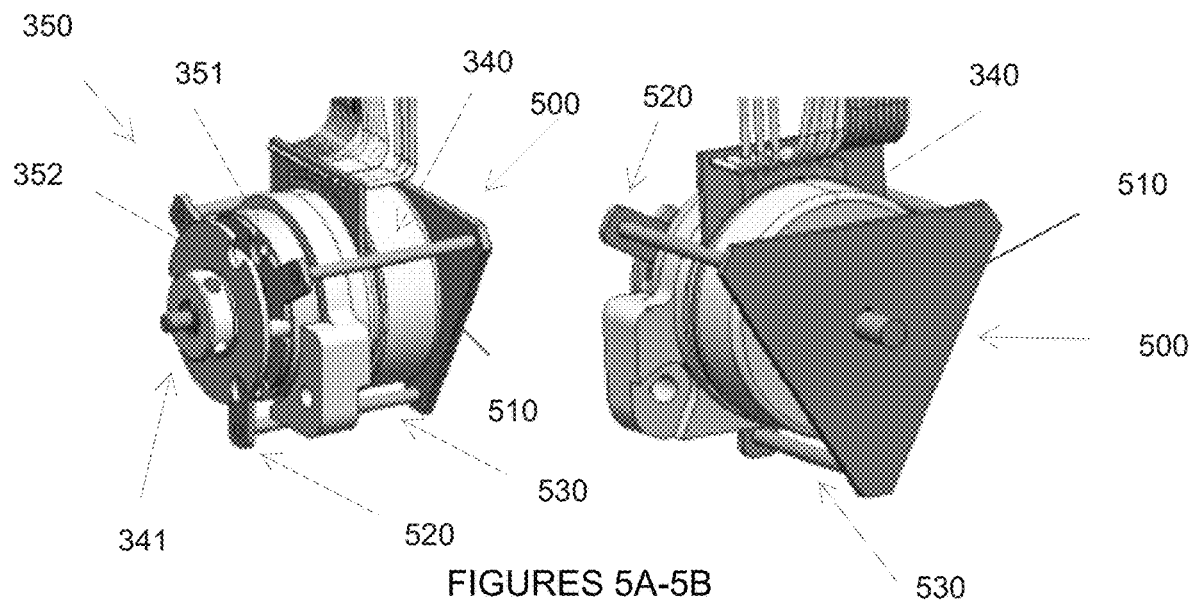
FIGS. 5A-5C show one example unpowered release mechanism for a robotic tool of the robotic surgical system.
Figure 5C:
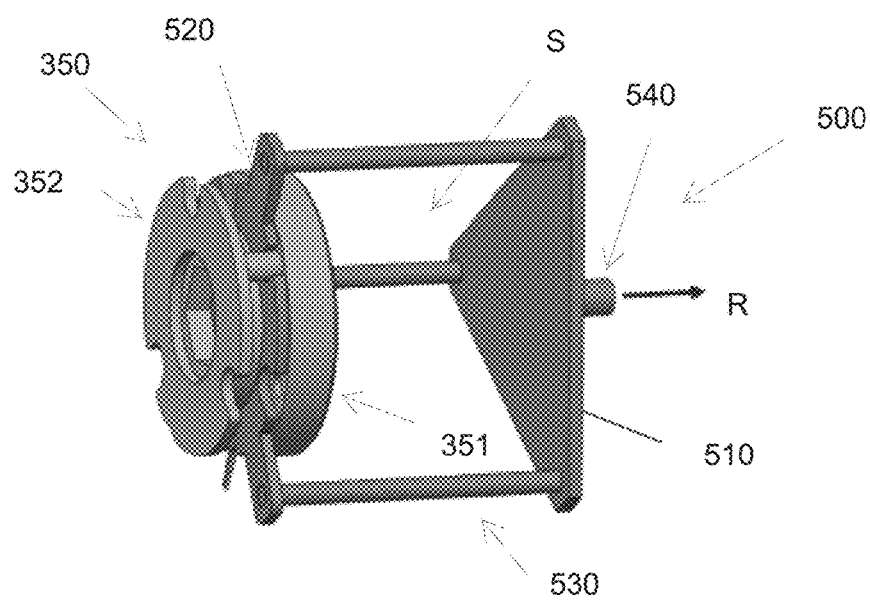

FIGS. 5A-5C illustrate an unpowered (e.g., mechanical, manual) brake release mechanism 500 operable (e.g., manually) to separate a first portion (e.g., armature) 351 of the brake 350 from a second portion (e.g., friction plate) 352 of the brake 350 to release (e.g., disengage) the brake 350 and allow a surgical tool (not shown) operatively coupled to the brake 350 and motor 340 (e.g., electric motor) to be manually retracted (e.g., from a surgical space in a patient) by a user.

The brake release mechanism 500 includes a first plate 510 and a second plate 520 spaced apart from the first plate 510, the first plate 510 connected to the second plate 520 by a plurality (e.g., three) rods 530. The first plate 510, the second plate 520 and the plurality of rod 530 define a frame. The second plate 520 can be at least partially disposed between the first portion (e.g., armature) 351 and the second portion (e.g., friction plate) 352 of the brake 350. The first plate 510 can be spaced from the second plate 520 to define a space S therebetween in which the first portion (e.g., armature) 351 of the brake 350 and motor 340 can be disposed. In operation, the brake release mechanism 500 can be manually actuated (e.g., in an unpowered manner), via a force (e.g., a linear force) applied to a connector 540 attached to the first plate 510 (e.g., along the central axis of the connector 540), to move (e.g., linearly move) the brake release mechanism 500 (e.g., move the second plate 520) in the retraction direction R (see FIG. 5C), causing the first portion (e.g., armature) 351 of the brake 350 to be displaced (e.g., separated) from the second portion (e.g., friction plate) 352 of the brake 350 to thereby release (e.g., disengage) the brake 350. While the brake 350 is disengaged, the user can manually retract the surgical tool 400 relative to the patient. As discussed above, in one implementation, the brake release mechanism 500 must be continually manually actuated (e.g., like a Deadman switch) to maintain the brake 350 in the released (e.g., disengaged) state, and once the brake release mechanism 500 is no longer actuated the brake 350 once again engages and movement of the surgical tool 400 is inhibited (e.g., prevented).

FIGS. 6A-6F show different views of a brake release mechanism 500A. Some of the features of the brake release mechanism 500A are similar to features of the brake release mechanism 500 in FIGS. 5A-5C. Thus, reference numerals used to designate the various components of the brake release mechanism 500A are identical to those used for identifying the corresponding components of the brake release mechanism 500 in FIGS. 5A-5C, except that an "A" has been added to the numerical identifier. Therefore, the structure and description for the various features of the brake release mechanism 500 and how it's operated and controlled in FIGS. 5A-5C are understood to also apply to the corresponding features of the brake release mechanism 500A in FIGS. 6A-6F, except as described below.

The brake release mechanism 500A differs from the brake release mechanism 500 in that it includes a lever 550A (or actuator) pivotally coupled to a surface 51 of the central drive unit 50 via a first joint 550A1 and pivotally coupled to a connector arm 560A via a second joint 550A2 that is spaced from the first joint 550A1. The connector arm 560A is pivotally coupled to the connector 540A via a third joint 560A1.

In operation, the lever 550A can be moved between a collapsed or stowed position (see FIGS. 6C-6D) where the lever 550A extends generally parallel to the surface 51 and an extended or pulled position (see FIGS. 6E-6F) where the lever 550A is pulled away from the surface 51 and extends at an angle (e.g., acute angle) relative to the surface 51. When the lever 550A is in the collapsed or stowed position (see FIGS. 6C-6D), the brake release mechanism 500A is not actuated, so that the brake 350 is engaged (e.g., if there is a loss of power or hardware/software malfunction). When the lever 550A is moved to the extended or pulled position (see FIGS. 6E-6F)—that is, when a user pulls on the lever 550A to move it to the extended position—the lever 550A pivots (via the first joint 550A1) relative to surface 51, causing the lever 550A to exert a pull force (in direction R shown in FIG. 5C) on the connector arm 560A, which transfers said pull force to the second plate 520A via the connector 540A, first plate 510A and rods 530A. Such a pull force exerted on the second plate 520A, as discussed above in connection with the brake release mechanism 500, pulls the first portion (e.g., armature) 351 of the brake 350 away from the second portion (e.g., friction disc) 352 of the brake 350 to thereby release (e.g., disengage) the brake 350 and allow the manual retraction (by a user) of the surgical tool 400 relative to the patient for the associated instrument drive assembly 300.

Figures 6A, 6B:
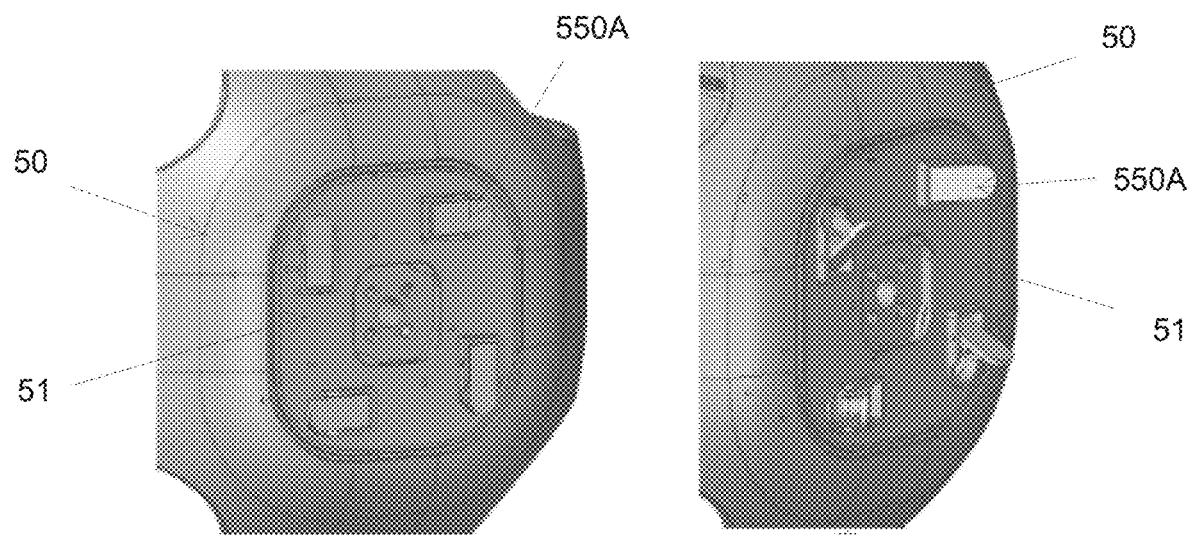
Figure 6C:
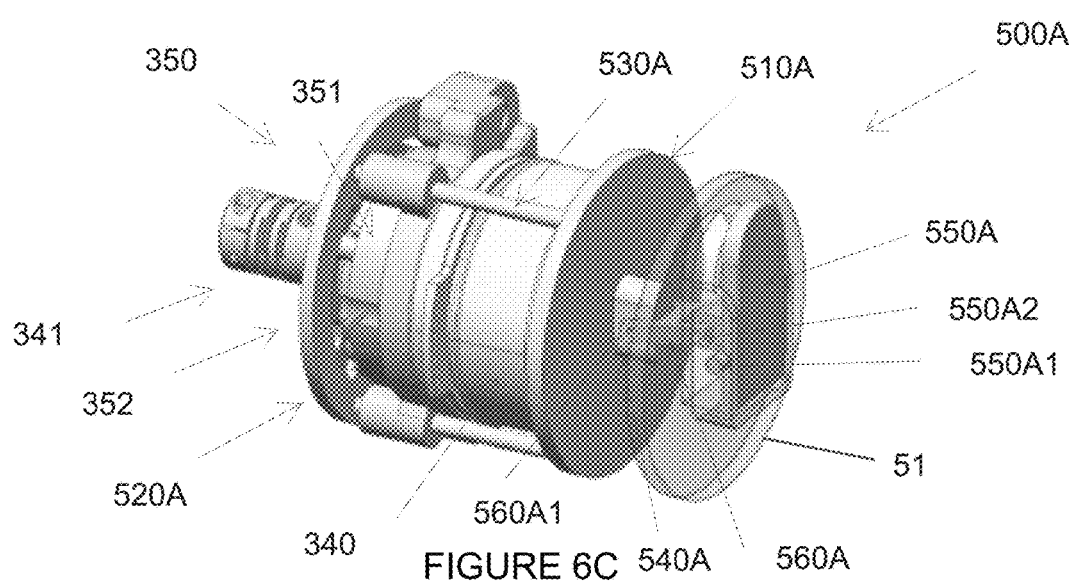
Figure 6D:
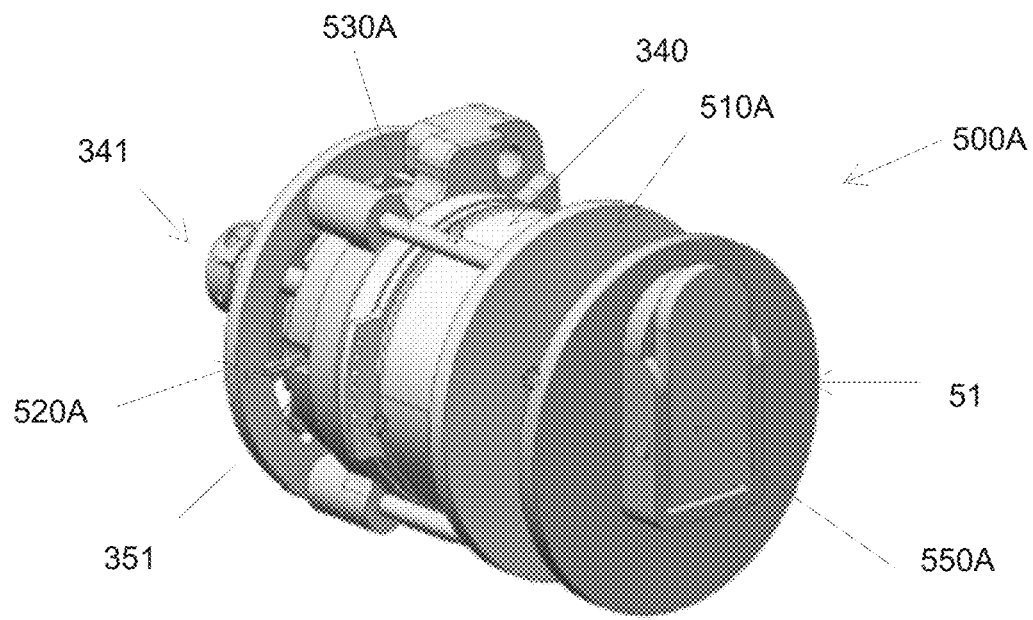
Figure 6E:
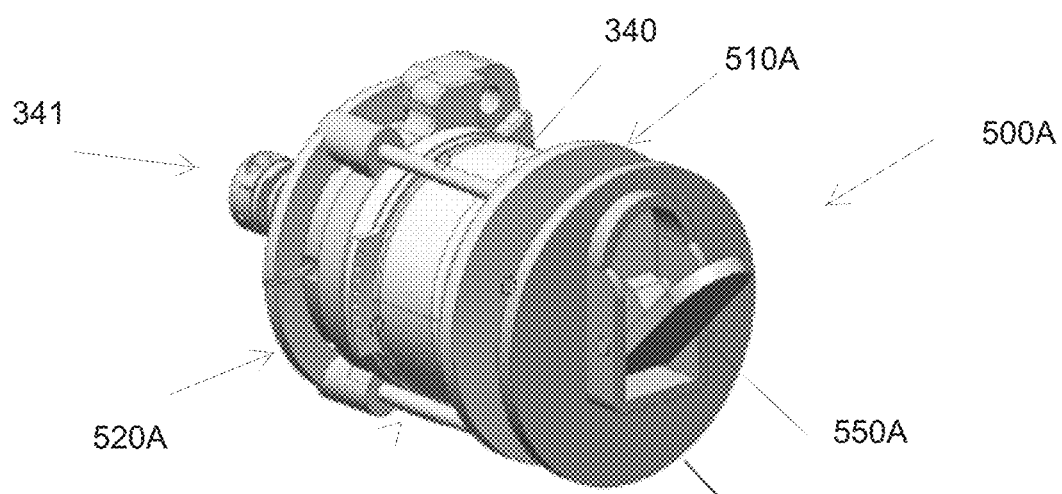

As discussed previously, each instrument drive assembly 300 associated with each robotic tool (e.g., surgical robotic tool, surgical tool) 400 has an associated brake release mechanism 500A. FIGS. 6A-6B show a rear portion of the central drive unit 50 with four levers 550A pivotally coupled to the surface 51 of the central drive unit 50, each lever 550A being part of a brake release mechanism 500A for a separate robotic tool (e.g., surgical robotic tool, surgical tool) 400 of the central drive unit 50.

FIGS. 7A-7F show different views of a brake release mechanism 500B. Some of the features of the brake release mechanism 500B are similar to features of the brake release mechanism 500A in FIGS. 6A-6C. Thus, reference numerals used to designate the various components of the brake release mechanism 500B are identical to those used for identifying the corresponding components of the brake release mechanism 500A in FIGS. 6A-6F, except that a "B" instead of an "A" has been added to the numerical identifier. Therefore, the structure and description for the various features of the brake release mechanism 500A and how it's operated and controlled in FIGS. 6A-6F are understood to also apply to the corresponding features of the brake release mechanism 500B in FIGS. 7A-7F, except as described below.

The brake release mechanism 500B differs from the brake release mechanism 500A in that the lever 550B (or actuator) is pivotally coupled to the surface 51 of the central drive unit 50 via a first joint 550B1 and pivotally coupled to a connector arm 560B via a second joint 550B2 that is spaced from the first joint 550B1. The connector arm 560B is pivotally coupled to the connector 540B via a third joint 560B1.

In operation, the lever 550B can be moved between a stowed position (see FIGS. 7C-7D) where the lever 550B extends generally parallel to the surface 51 and a depressed position (see FIGS. 7E-7F) where the lever 550B is pushed toward the surface 51 to extends at an angle (e.g., acute angle) relative to the surface 51.

When the lever 550B is in the collapsed or stowed position (see FIGS. 7C-7D), the brake release mechanism 500B is not actuated, so that the brake 350 is engaged (e.g., if there is a loss of power or hardware/software malfunction). When the lever 550B is moved to the depressed position (see FIGS. 7E-7F)—that is, when a user pushes on the lever 550B to move it to the depressed position—the lever 550B pivots (via the first joint 550B1) relative to surface 51, causing the lever 550B to exert a pull force (in direction R shown in FIG. 5C) on the connector arm 560B, which transfers said pull force to the second plate 520B via the connector 540B, first plate 510B and rods 530B. Such a pull force exerted on the second plate 520B, as discussed above in connection with the brake release mechanism 500, pulls the first portion (e.g., armature) 351 of the brake 350 away from the second portion (e.g., friction disc) 352 of the brake 350 to thereby release (e.g., disengage) the brake 350 and allow the manual retraction (by a user) of the surgical tool 400 relative to the patient for the associated instrument drive assembly 300.

Figure 7A:
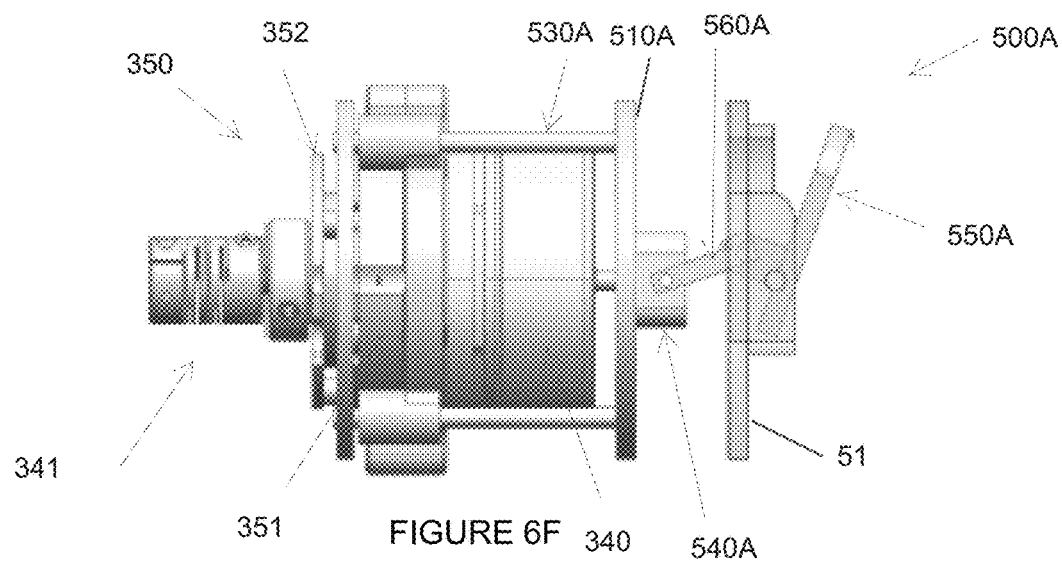
FIGS. 7A-7F show another example unpowered release mechanism for a robotic tool of the robotic surgical system.
Figure 7B:
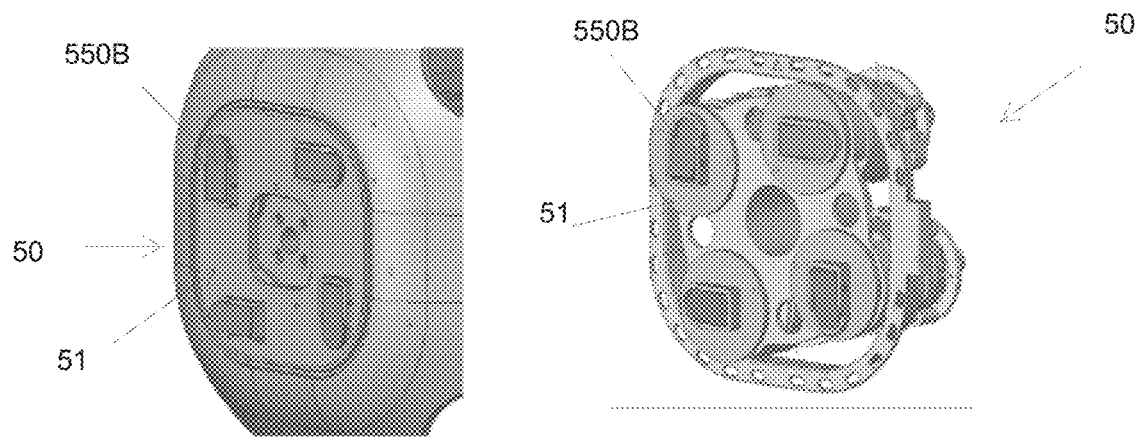
Figure 7C:
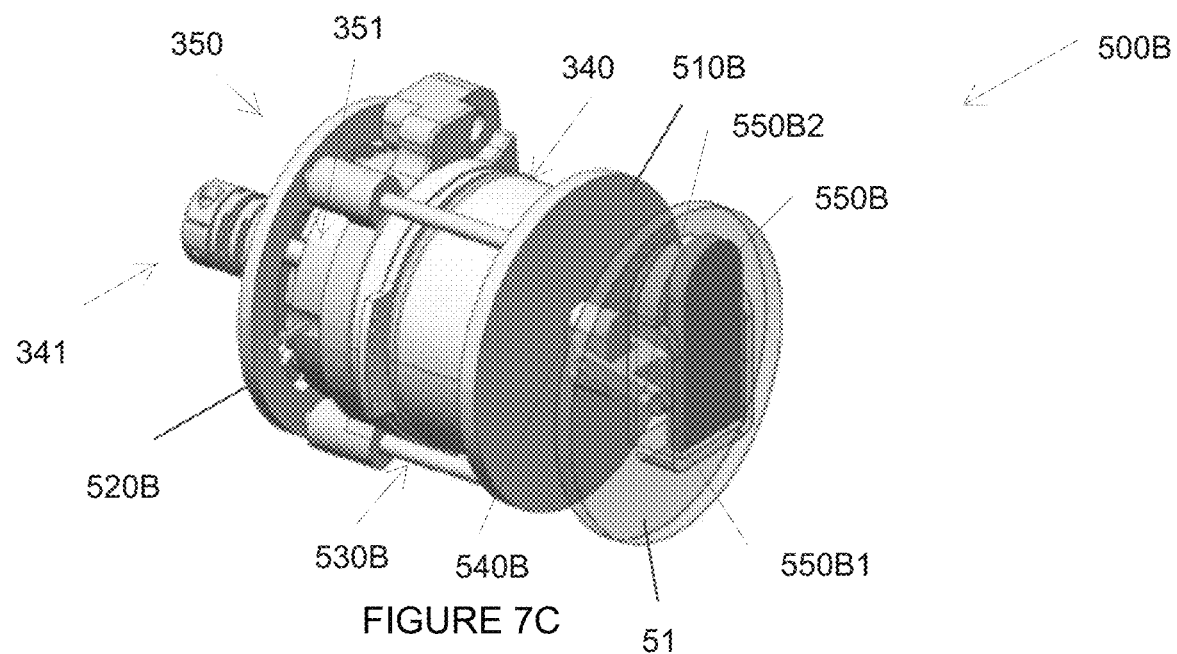
Figure 7D:
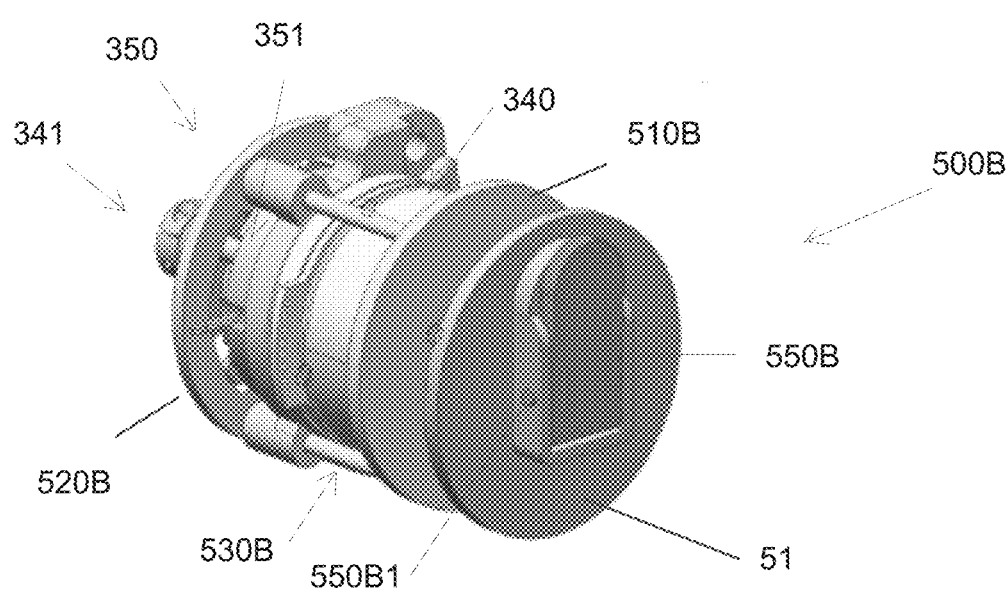
Figure 7E:
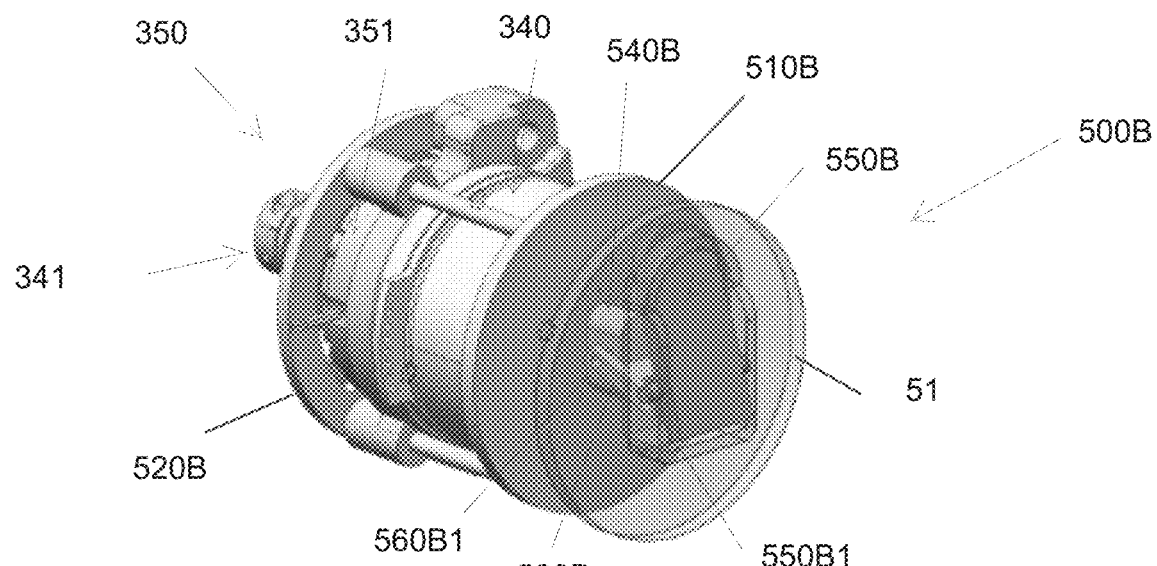
Figure 7F:
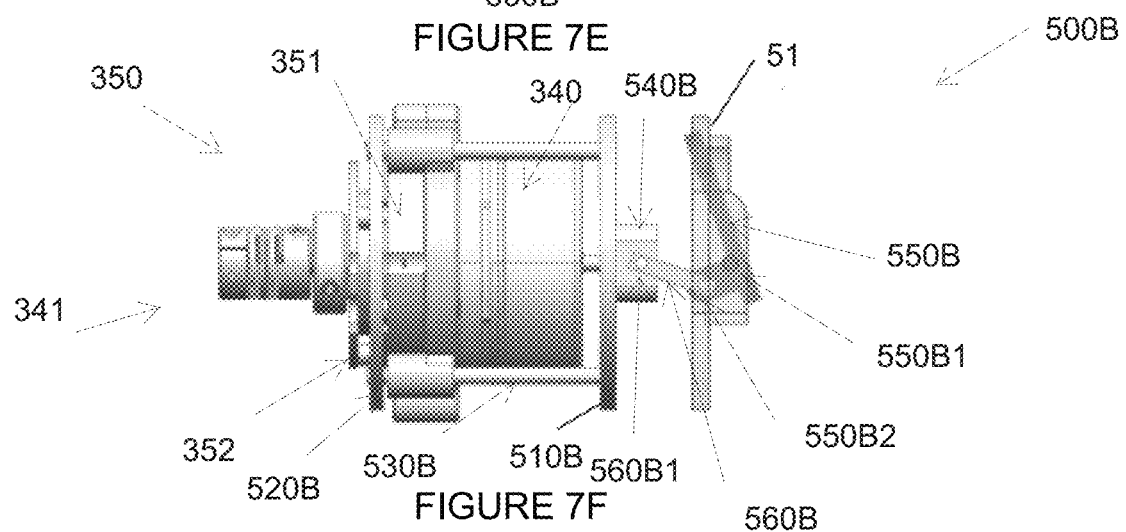

As discussed previously, each instrument drive assembly 300 associated with each robotic tool (e.g., surgical robotic tool, surgical tool) 400 has an associated brake release mechanism 500B. FIGS. 7A-7B show a rear portion of the central drive unit 50 with four levers 550B pivotally coupled to the surface 51 of the central drive unit 50, each lever 550B being part of a brake release mechanism 500B for a separate robotic tool (e.g., surgical robotic tool, surgical tool) 400 of the central drive unit 50.

FIGS. 8A-8D show different views of a brake release mechanism 500C. Some of the features of the brake release mechanism 500C are similar to features of the brake release mechanism 500A in FIGS. 6A-6C. Thus, reference numerals used to designate the various components of the brake release mechanism 500C are identical to those used for identifying the corresponding components of the brake release mechanism 500A in FIGS. 6A-6F, except that a "C" instead of an "A" has been added to the numerical identifier. Therefore, the structure and description for the various features of the brake release mechanism 500A and how it's operated and controlled in FIGS. 6A-6F are understood to also apply to the corresponding features of the brake release mechanism 500C in FIGS. 8A-8D, except as described below.

The brake release mechanism 500C differs from the brake release mechanism 500A in that it has a handle 550C (or actuator or lever) attached to the surface 51 of the central drive unit 50 and rotatably coupled to the connector 540C attached to the first plate 510C. The handle 550C has a hub with a ramped inner surface 550C1 (e.g., a threaded surface) that extend through an opening 52 in the surface 51 and rotatably couples to the connector 540C. The ramped inner surface 550C1 of the handle 550C engages a ramped surface 540C1 (e.g., threaded surface) of the connector 540C. The handle 550C is rotatable between a first position (see FIG. 8C) and a second position (e.g., approximately 90 degrees to the first position). In the first position (see FIG. 8C), the brake release mechanism 500C is not actuated, so that the brake 350 is engaged (e.g., if there is a loss of power or hardware/software malfunction).

When the handle 550C is rotated to the second position (e.g., 90 degrees relative to the first position) the ramped inner surface 550C1 of the handle 550C engages the ramped surface 540C1 of the connector 540C and applies a pulling force on the connector 540C. Such a pull force exerted on the second plate 520C, as discussed above in connection with the brake release mechanism 500, pulls the first portion (e.g., armature) 351 of the brake 350 away from the second portion (e.g., friction disc) 352 of the brake 350 to thereby release (e.g., disengage) the brake 350 and allow the manual retraction (by a user) of the surgical tool 400 relative to the patient for the associated instrument drive assembly 300.

Figure 8A:
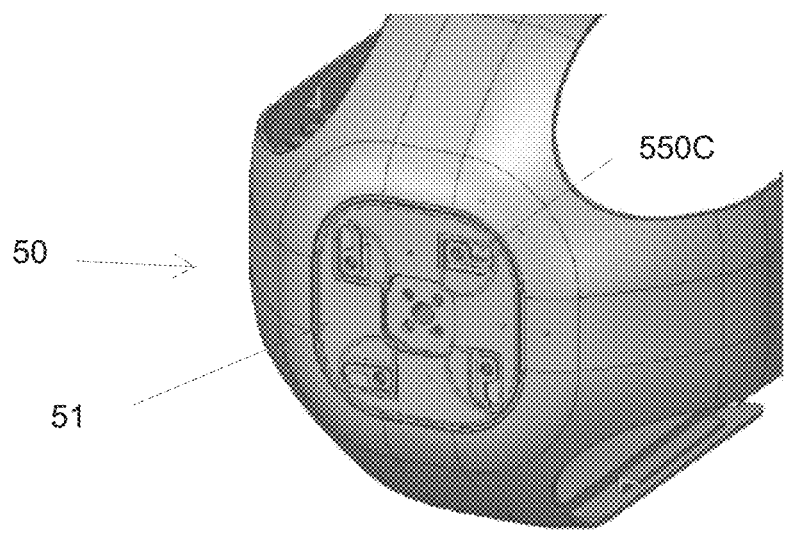
FIGS. 8A-8D show another example unpowered release mechanism for a robotic tool of the robotic surgical system.
Figure 8B:
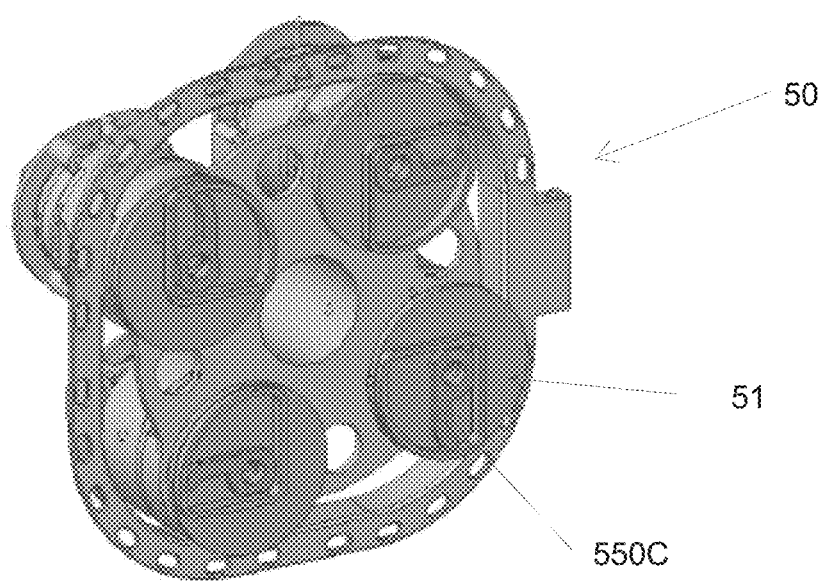
Figure 8C:
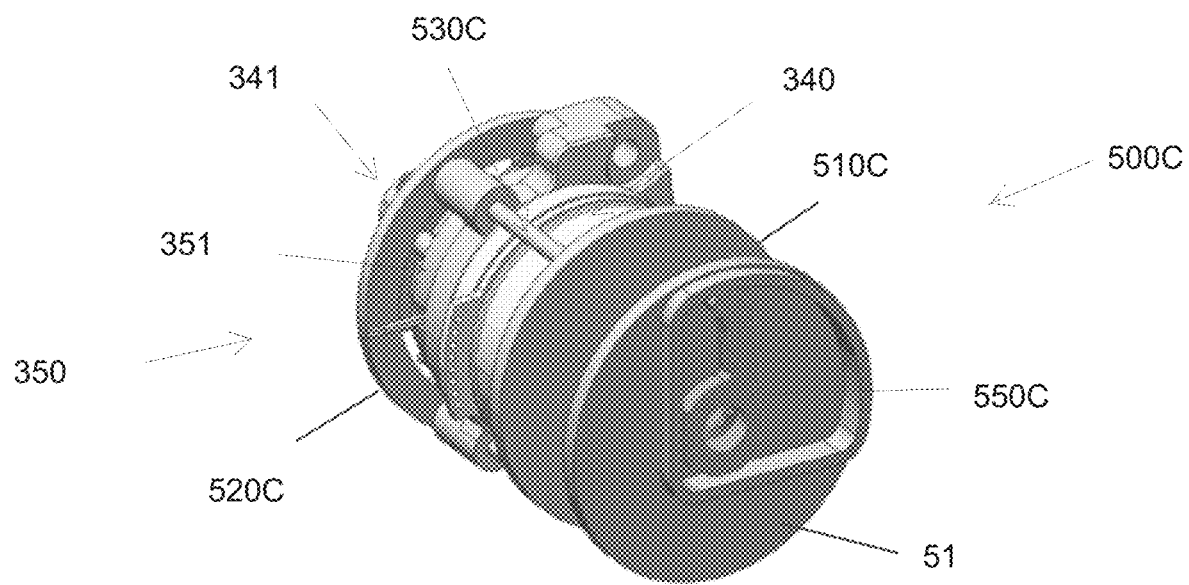
Figure 8D:
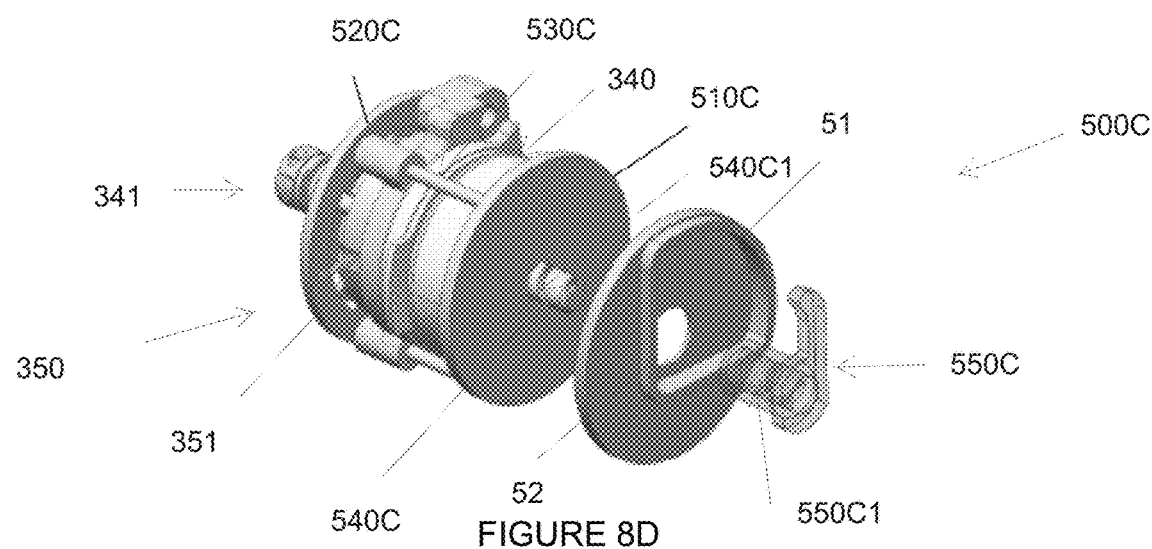

As discussed previously, each instrument drive assembly 300 associated with each robotic tool (e.g., surgical robotic tool, surgical tool) 400 has an associated brake release mechanism 500B. FIGS. 8A-8B show a rear portion of the central drive unit 50 with four rotatable handles 550C coupled to the surface 51 of the central drive unit 50, each handle 550C being part of a brake release mechanism 500C for a separate robotic tool (e.g., surgical robotic tool, surgical tool) 400 of the central drive unit 50.

FIGS. 9A-9E show different views of a brake release mechanism 500D. Some of the features of the brake release mechanism 500D are similar to features of the brake release mechanism 500 in FIGS. 5A-5C. Thus, reference numerals used to designate the various components of the brake release mechanism 500D are identical to those used for identifying the corresponding components of the brake release mechanism 500 in FIGS. 5A-5C, except that a "D" has been added to the numerical identifier. Therefore, the structure and description for the various features of the brake release mechanism 500 and how it's operated and controlled in FIGS. 5A-5C are understood to also apply to the corresponding features of the brake release mechanism 500D in FIGS. 9A-9E, except as described below.

The brake release mechanism 500D differs from the brake release mechanism 500 in that instead of the first plate 510, second plate 520 and rods 530 it includes a torque arm 520D with spacer supports 525D rotatably coupled to frame supports 529D along axis X via joints 529D1 (e.g., pins extending through holes) between the frame supports 529D and spacer supports 525D of the torque arm 520D. The spacer supports 525D include spacers 527D having a rectangular cross-section (e.g., with a greater width than height). The spacers 527D are disposed between the first portion (e.g., armature) 351 of the brake 350 and the second portion (e.g., friction plate) 352 of the brake 350.

In operation, when the torque arm 520D is rotated about the axis Z, the spacers 527D rotate about the axis Z (e.g., so that the rectangular profile of the spacer 527D is not coplanar with the surface of the first portion 351 or second portion 352) and urge the first portion 351 (e.g., armature) and second portion 352 (e.g., friction disc) of the brake 350 apart, to thereby release (e.g., disengage) the brake 350 and allow the manual retraction (by a user) of the surgical tool 400 relative to the patient for the associated instrument drive assembly 300. When the torque arm 520D is not rotated about the axis Z and remains in a home position (e.g., so that the rectangular profile of the spacer 527D is coplanar with the surface of the first portion 351 or second portion 352), the brake release mechanism 500D is not actuated, so that the brake 350 is engaged (e.g., if there is a loss of power or hardware/software malfunction).

Figure 9A:
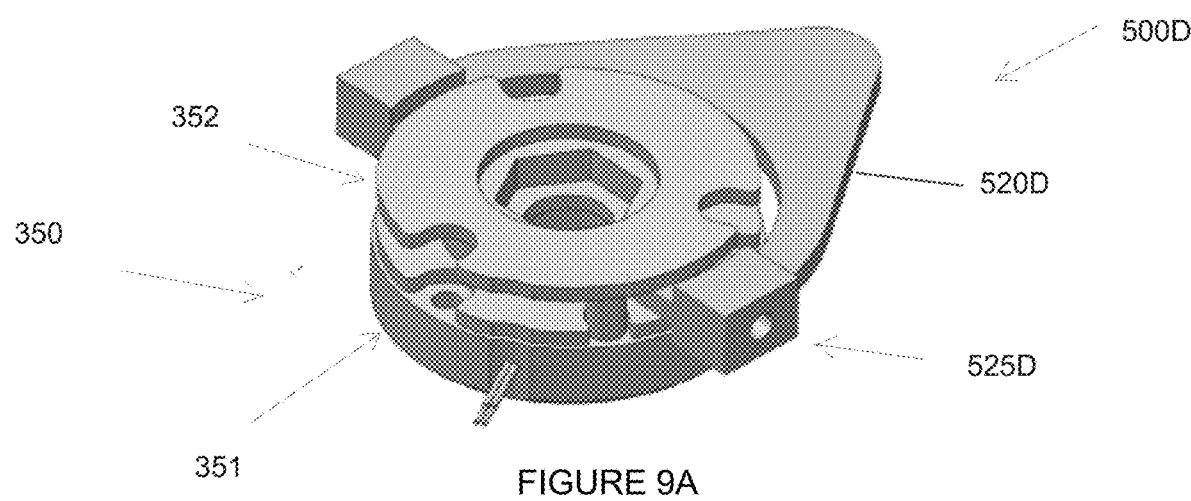
FIGS. 9A-9E show another example unpowered release mechanism for a robotic tool of the robotic surgical system.
Figure 9B:
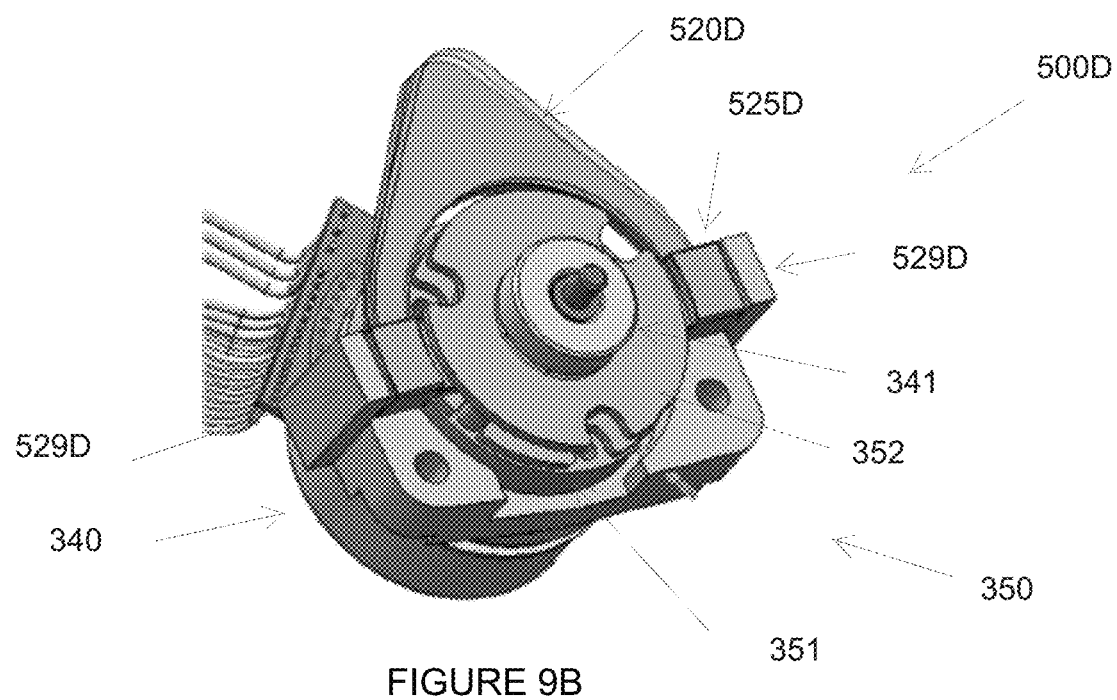
Figure 9C:
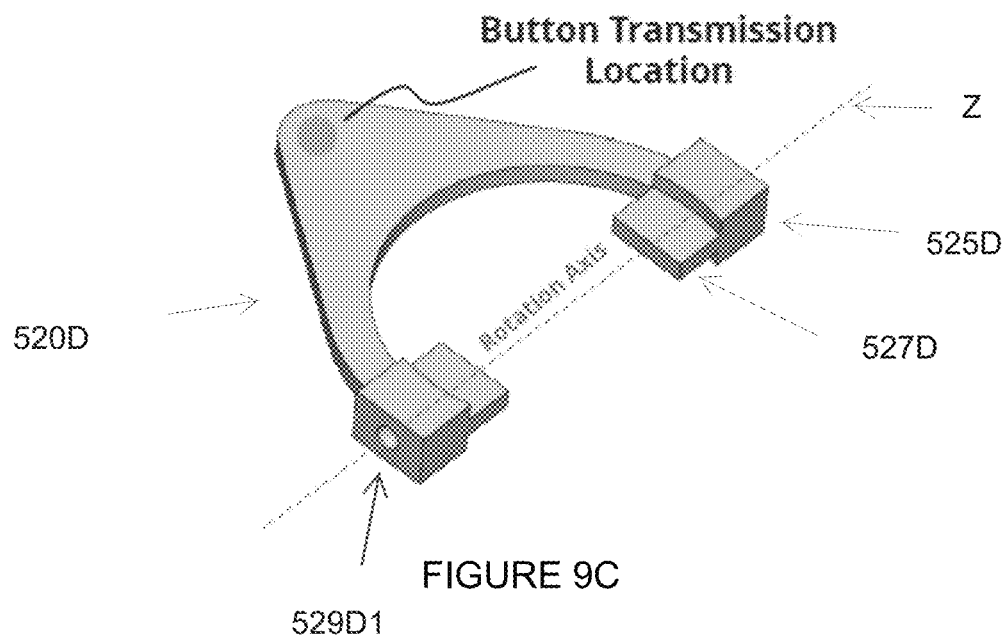
Figure 9D:
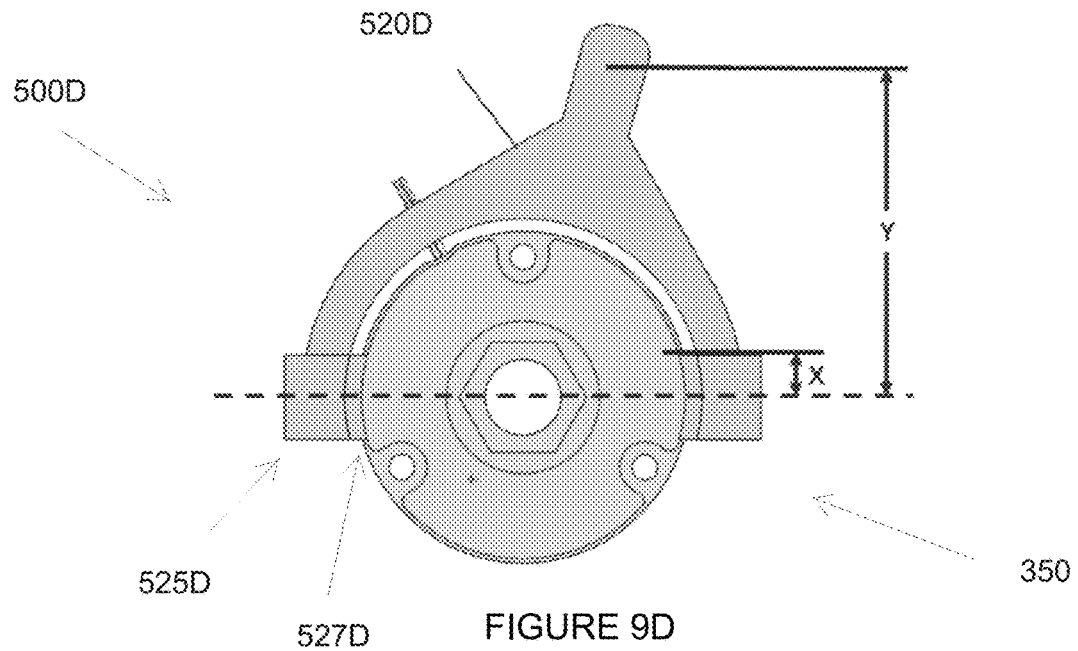
Figure 9E:
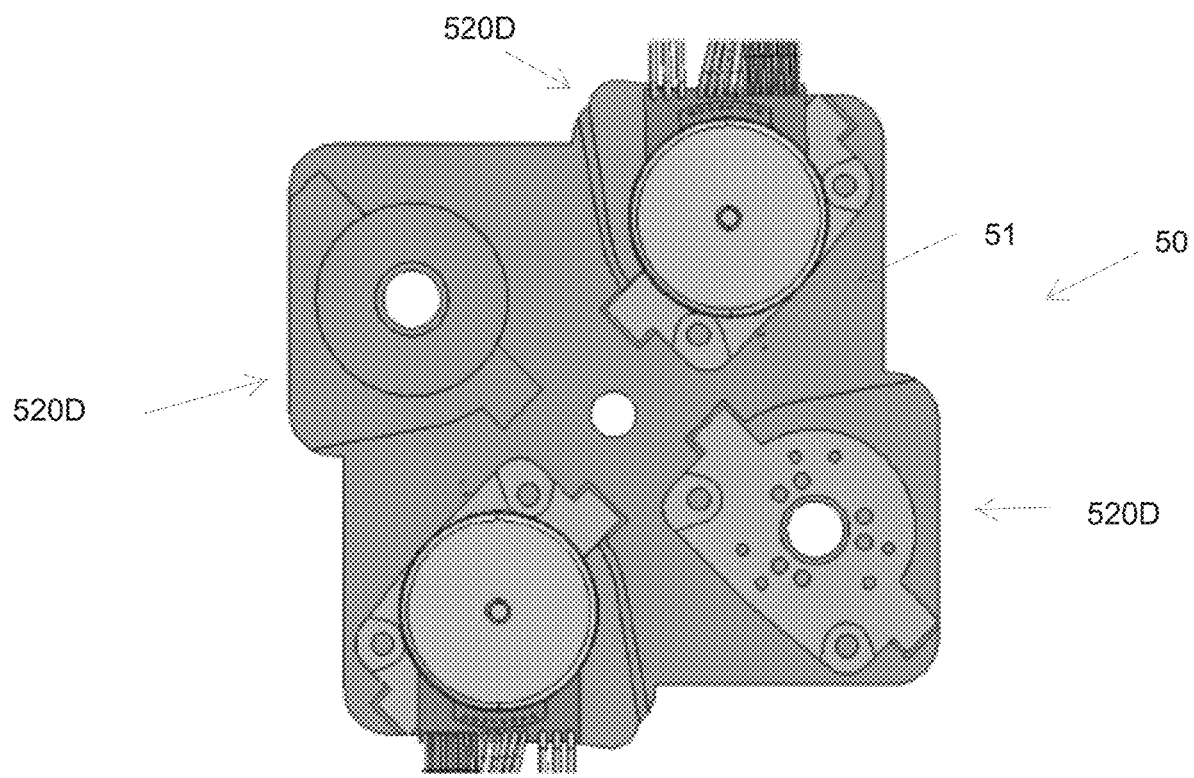

With reference to FIG. 9D, the torque arm 520D can have a torque arm length Y from the axis Z and a spacer width X from the axis Z to therefore provide a mechanical ratio Y/X of approximately 8. An actuation force of approximately 5 Newtons (e.g., 1.1 lbf) can be applied to rotate the torque arm 520D to urge the first portion 351 and second portion 352 apart, to thereby release (e.g., disengage) the brake 350. FIG. 9E shows four torque arms 520D associated with different instrument drive assemblies.

FIGS. 10A-10D show different views of a brake release mechanism 500E. Some of the features of the brake release mechanism 500E are similar to features of the brake release mechanism 500D in FIGS. 9A-9E. Thus, reference numerals used to designate the various components of the brake release mechanism 500E are identical to those used for identifying the corresponding components of the brake release mechanism 500D in FIGS. 9A-9E, except that an "E" instead of a "D" has been added to the numerical identifier. Therefore, the structure and description for the various features of the brake release mechanism 500D and how it's operated and controlled in FIGS. 9A-9E are understood to also apply to the corresponding features of the brake release mechanism 500E in FIGS. 10A-10D, except as described below.

The brake release mechanism 500E differs from the brake release mechanism 500D in that the torque arm 520E has a connector 521E that extends through a guide 522E. The torque arm 20E has spacer supports 525D rotatably coupled to the frame supports 529E via joints 529E1 (e.g., pins extending through holes) between the frame supports 529E and spacer supports 525E of the torque arm 520E. The spacers 527E attached to the spacer supports 525E have a rectangular cross-section (e.g., with a greater width than height). The spacers 527E are disposed between the first portion (e.g., armature) 351 of the brake 350 and the second portion (e.g., friction plate) 352 of the brake 350.

Figure 10A:
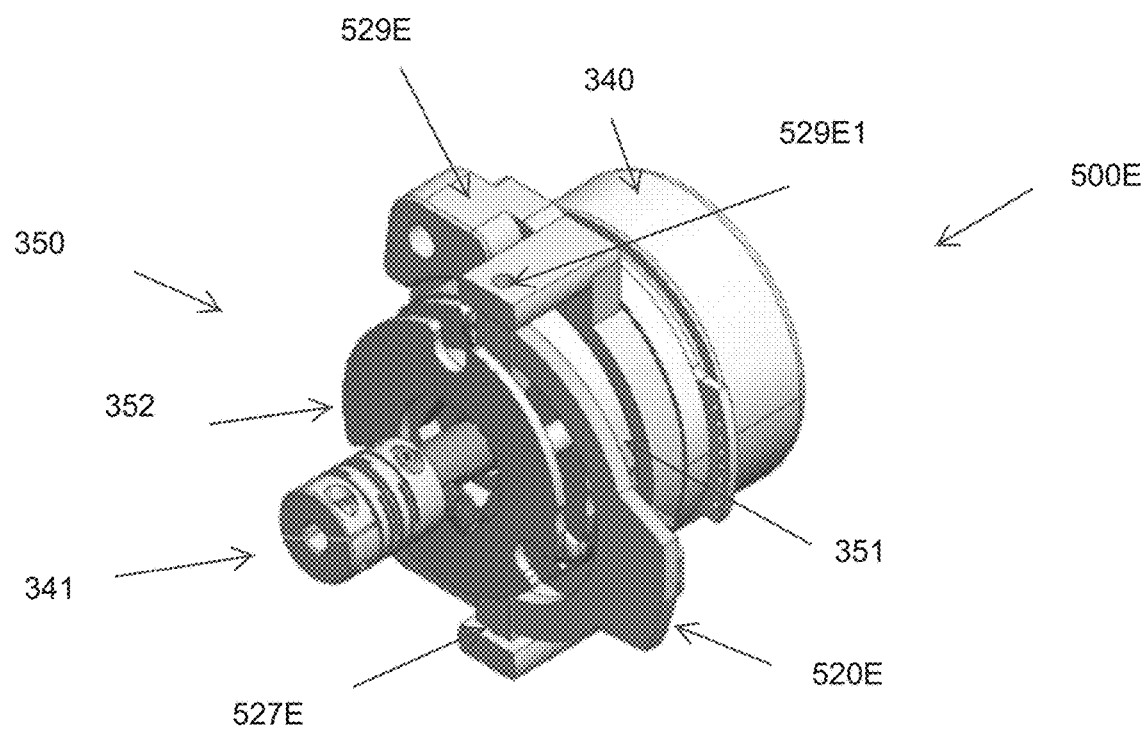
FIGS. 10A-10D show another example unpowered release mechanism for a robotic tool of the robotic surgical system.
Figure 10B:
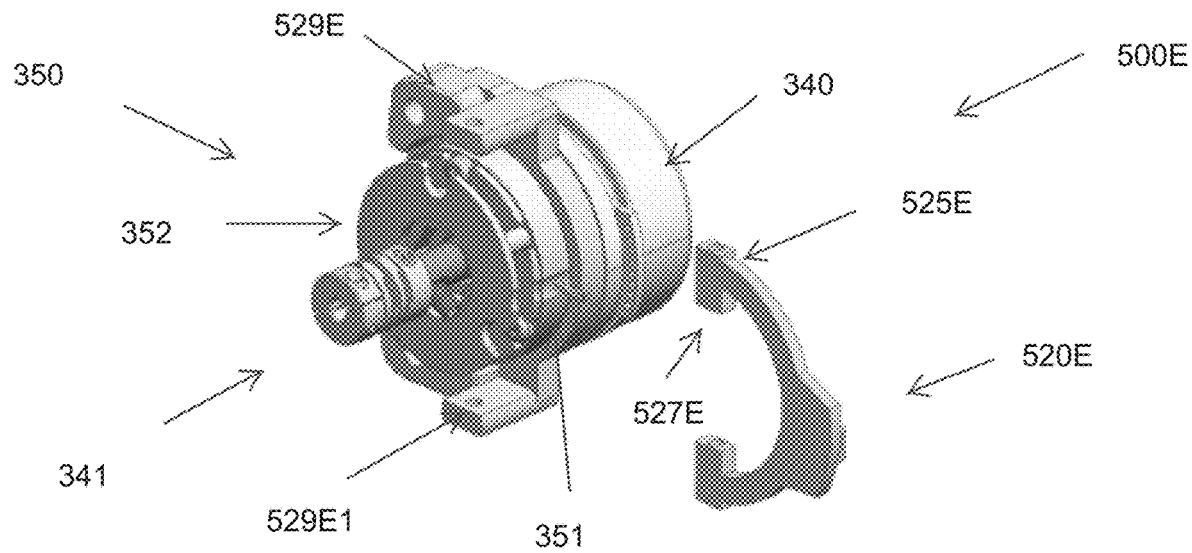
Figure 10C:
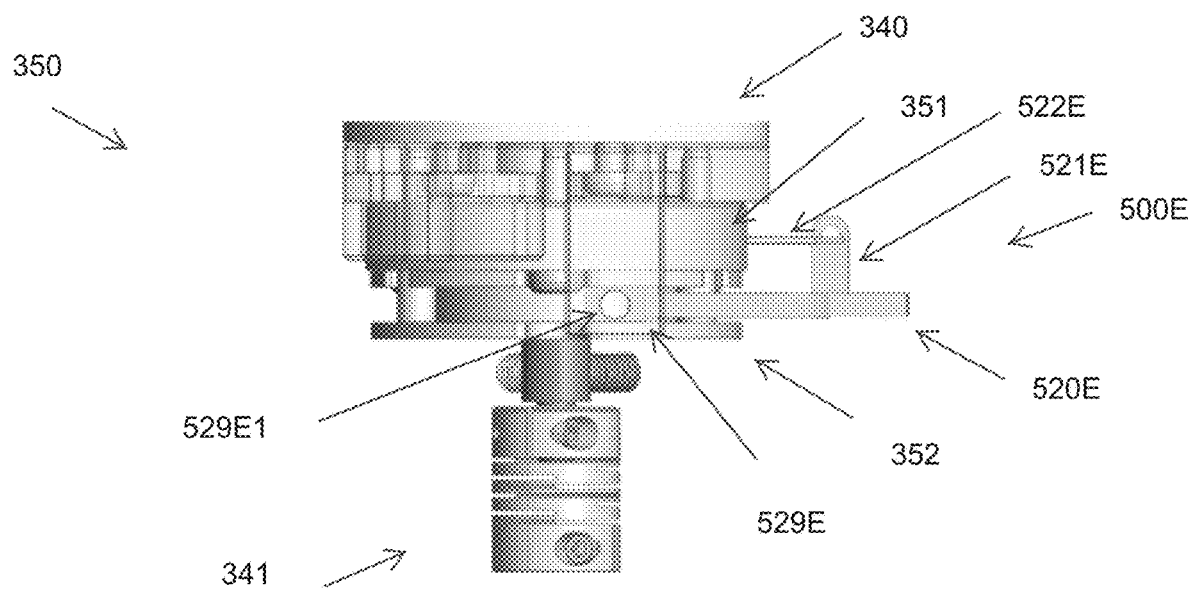
Figure 10D:
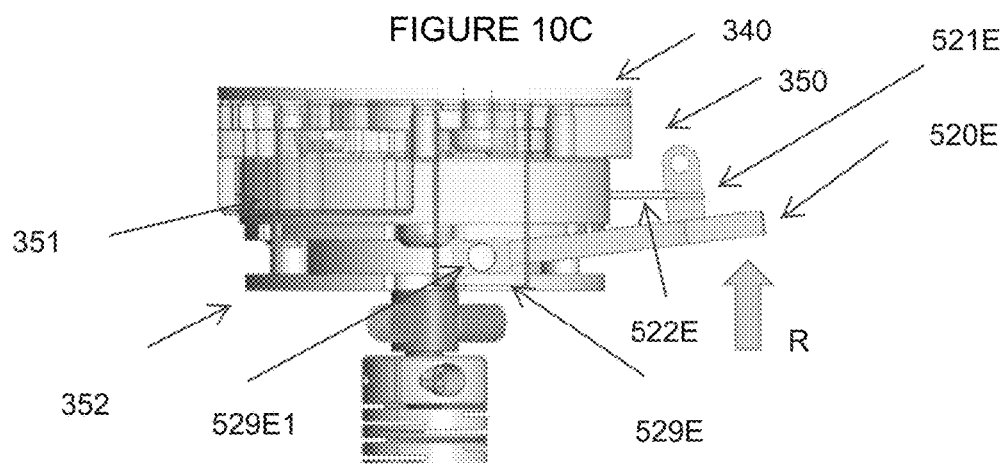

In operation, a force is applied via the connector 521E to the torque arm 520E in direction R (e.g., direction toward the motor 340, as shown in FIG. 10D) to rotate the spacers 527E (e.g., so that the rectangular profile of the spacer 527E is not coplanar with the surface of the first portion 351 or second portion 352) and urge the first portion 351 (e.g., armature) and second portion 352 (e.g., friction disc) of the brake 350 apart, to thereby release (e.g., disengage) the brake 350 and allow the manual retraction (by a user) of the surgical tool 400 relative to the patient for the associated instrument drive assembly 300. When the torque arm 520E is not rotated and remains in a home position (e.g., so that the rectangular profile of the spacer 527E is coplanar with the surface of the first portion 351 or second portion 352), the brake release mechanism 500E is not actuated, so that the brake 350 is engaged (e.g., if there is a loss of power or hardware/software malfunction).

FIGS. 11A-11E show different views of a brake release mechanism 500F. Some of the features of the brake release mechanism 500F are similar to features of the brake release mechanism 500E in FIGS. 10A-10D. Thus, reference numerals used to designate the various components of the brake release mechanism 500F are identical to those used for identifying the corresponding components of the brake release mechanism 500E in FIGS. 10A-10D, except that an "F" instead of an "E" has been added to the numerical identifier. Therefore, the structure and description for the various features of the brake release mechanism 500E and how it's operated and controlled in FIGS. 10A-10D are understood to also apply to the corresponding features of the brake release mechanism 500F in FIGS. 11A-11E, except as described below.

The brake release mechanism 500F differs from the brake release mechanism 500E in that it includes a lever 550F pivotally coupled to a surface 51 of the central drive unit 50 via one or more pivot joints 550F1. The level 550F is pivotally coupled to a connector arm 560F via one or more pivot joints 550F2. The connector arm 560F is pivotally coupled to the connector 521F attached to the torque arm 520F via one or more joints 560F1.

In operation, a user can press on (e.g., depress) the lever 550F relative to the surface 51 to apply a force on the torque arm 520F via the connector arm 560F and connector 521F to rotate the torque arm 520F via pivot joints 529F1 relative to the frame supports 529F. rotation of the torque arm 520F rotates the spacers 527F (e.g., so that the rectangular profile of the spacer 527F is not coplanar with the surface of the first portion 351 or second portion 352) to urge the first portion 351 (e.g., armature) and second portion 352 (e.g., friction disc) of the brake 350 apart, to thereby release (e.g., disengage) the brake 350 and allow the manual retraction (by a user) of the surgical tool 400 relative to the patient for the associated instrument drive assembly 300. When the lever 550F is not depressed (e.g., when a user ceases to depress the lever 550F), the torque arm 520F is not rotated and remains in a home position (e.g., so that the rectangular profile of the spacer 527F is coplanar with the surface of the first portion 351 or second portion 352), the brake release mechanism 500F is not actuated, so that the brake 350 is engaged (e.g., if there is a loss of power or hardware/software malfunction). In one implementation, the brake release mechanism 500F can be spring loaded (e.g., via a spring between the lever 550F and the surface 51 and/or via a spring between the torque arm 520F and the frame supports 529F, such as torsion springs) so that the lever 550F and the torque arm 520F are biased toward a home position (see FIGS. 11A-11D) where the brake 350 can engage.

Figure 11A:
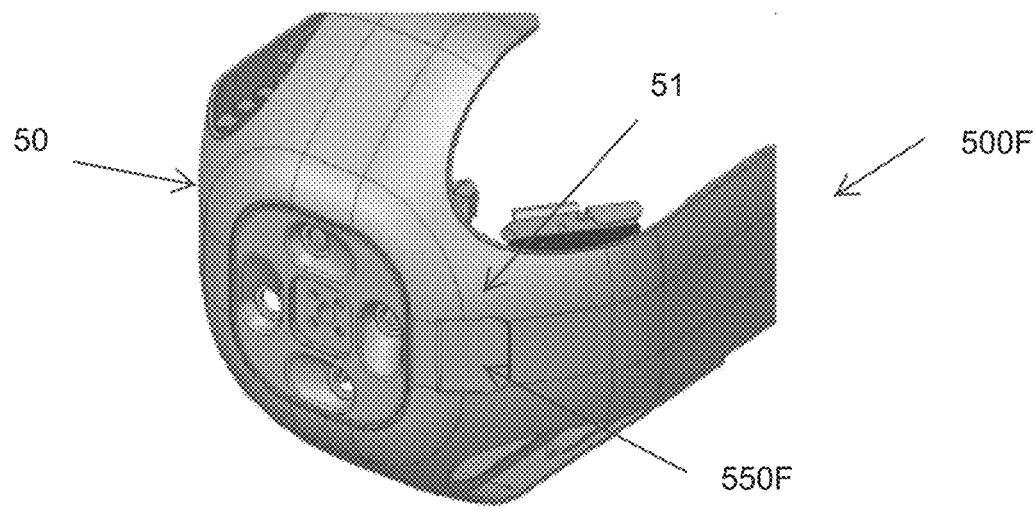
FIGS. 11A-11E show another example unpowered release mechanism for a robotic tool of the robotic surgical system.
Figure 11B:
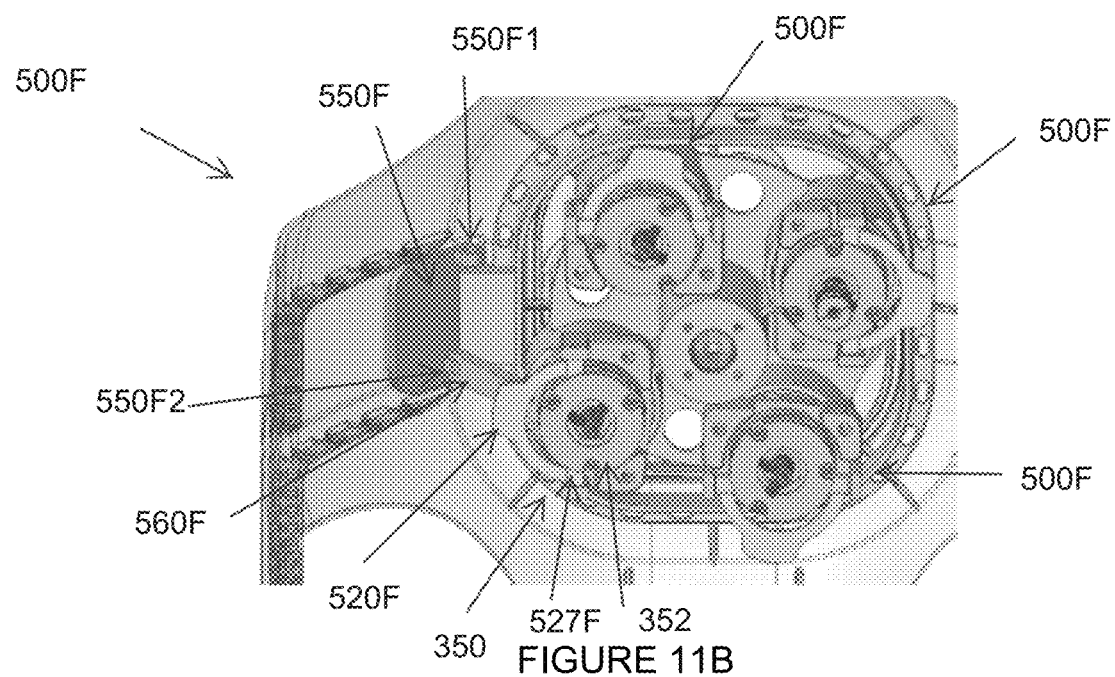
Figure 11C:
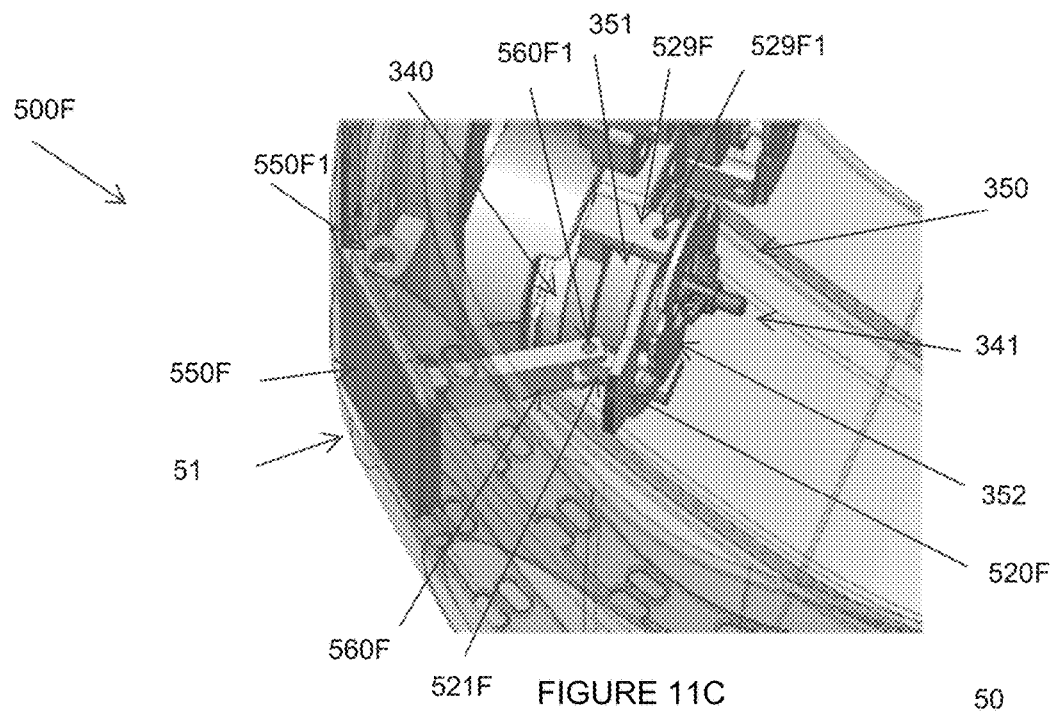
Figure 11D:
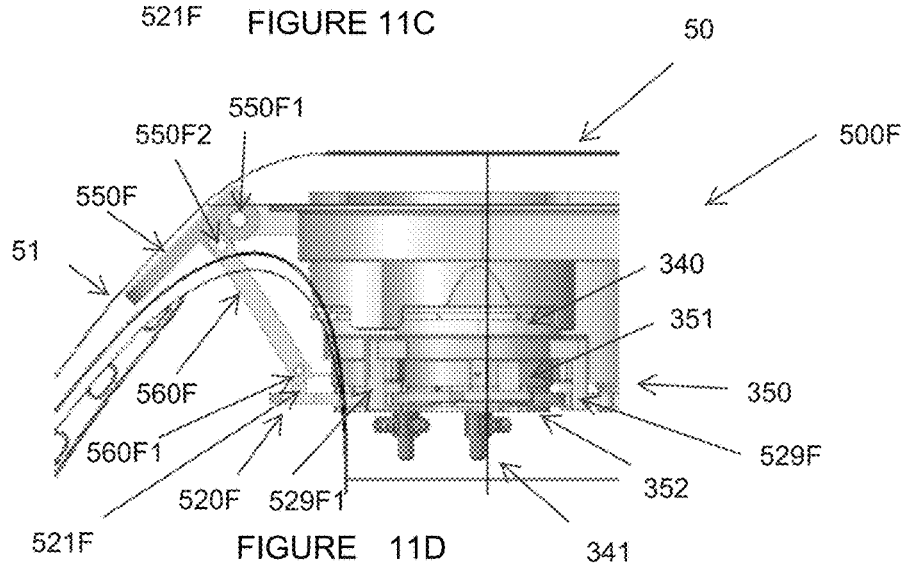
Figure 11E:
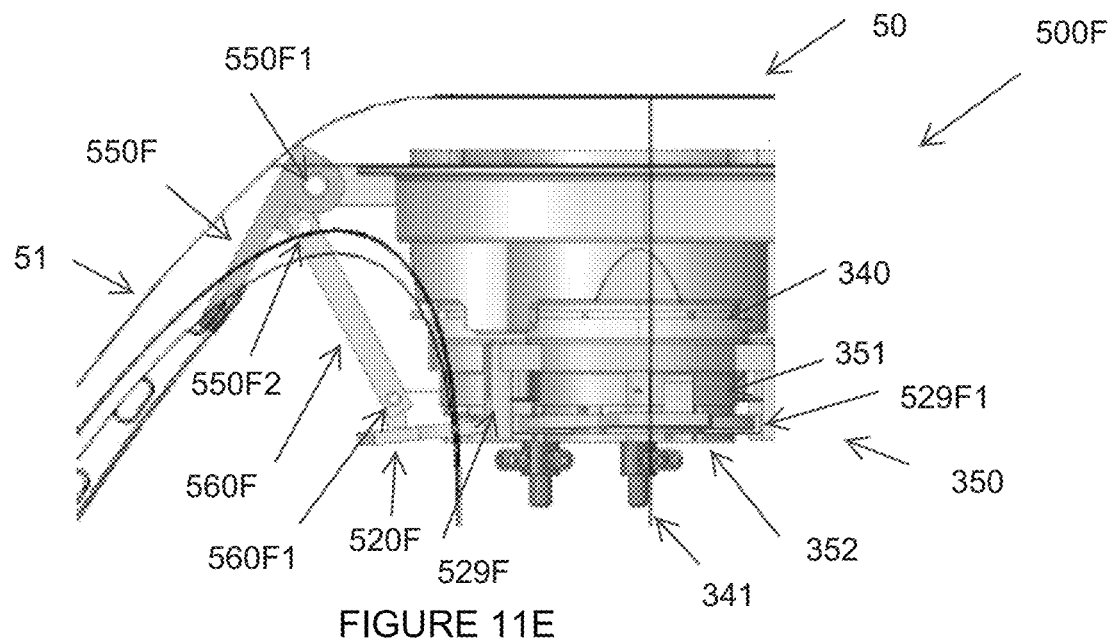

As discussed previously, each instrument drive assembly 300 associated with each robotic tool (e.g., surgical robotic tool, surgical tool) 400 has an associated brake release mechanism 500F. FIG. 11B shows an underside of a rear portion of the central drive unit 50 with four brake release mechanisms 500F, one for each instrument drive assembly 300. For clarity, FIG. 11B shows only one lever 550F and connector arm 560F, but one of skill in the art will recognize that each of the brake release mechanisms 500F shown in FIG. 11B can have a lever 550F and associated connector arm 560F.

FIGS. 12A-12E show different views of a brake release mechanism 500G. Some of the features of the brake release mechanism 500G are similar to features of the brake release mechanism 500F in FIGS. 11A-11E. Thus, reference numerals used to designate the various components of the brake release mechanism 500G are identical to those used for identifying the corresponding components of the brake release mechanism 500F in FIGS. 11A-11E, except that a "G" instead of an "F" has been added to the numerical identifier. Therefore, the structure and description for the various features of the brake release mechanism 500F and how it's operated and controlled in FIGS. 11A-11E are understood to also apply to the corresponding features of the brake release mechanism 500G in FIGS. 12A-12E, except as described below.

The brake release mechanism 500G differs from the brake release mechanism 500F in that the lever 550G is pivotally coupled to a surface 51 of the central drive unit 50 via one or more pivot joints 550G1 and a finger slot 52 is proximate the surface 51 an sized to receive one or more fingers of the user therein to provide additional leverage as the user presses on the lever 550G toward the surface 51 to actuate the brake release mechanism 500G. The level 550G is pivotally coupled to the connector arm 560G via one or more pivot joints 550G2. The connector arm 560G is pivotally coupled to the connector 521G attached to the torque arm 520G via one or more joints 560G1.

Figure 12A:
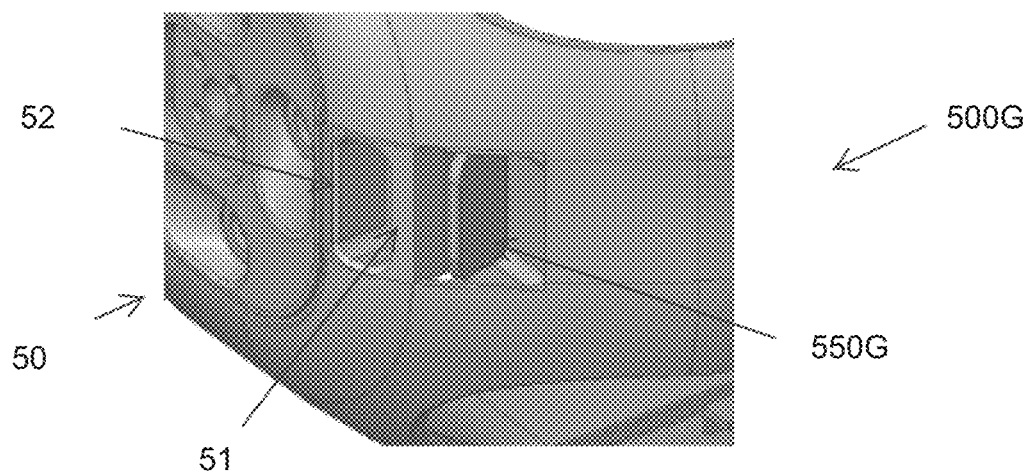
FIGS. 12A-12E show another example unpowered release mechanism for a robotic tool of the robotic surgical system.
Figure 12B:
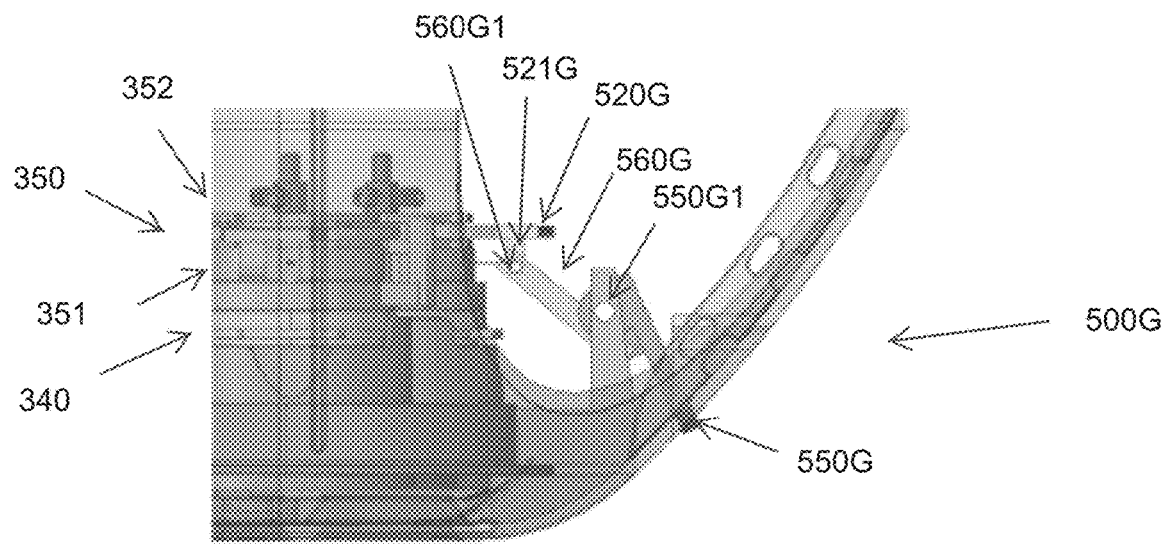
Figure 12C:
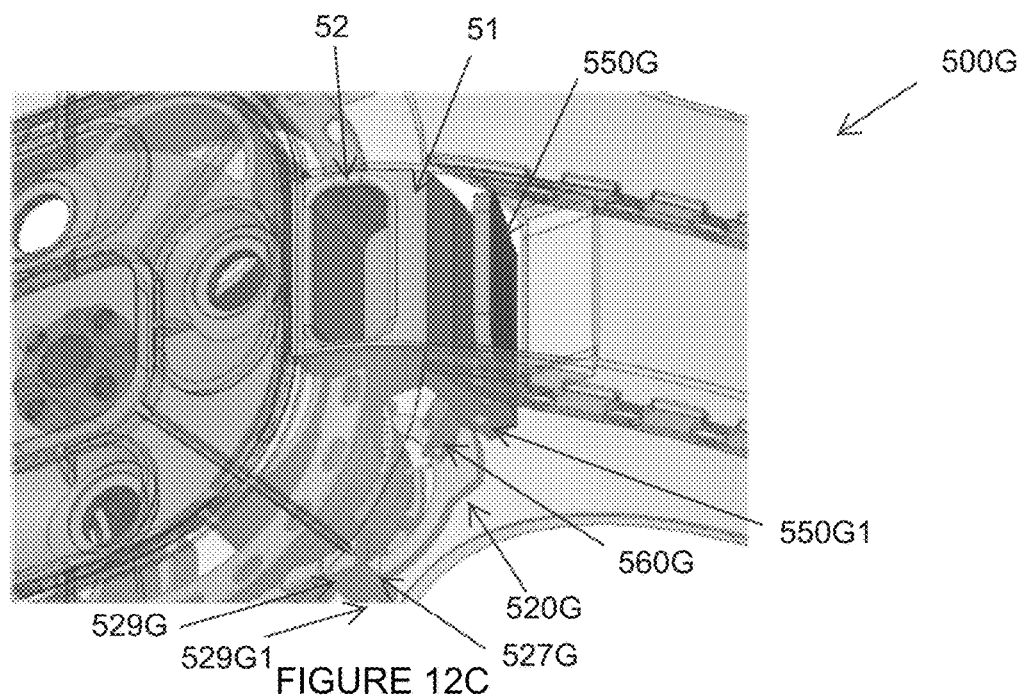
Figure 12D:
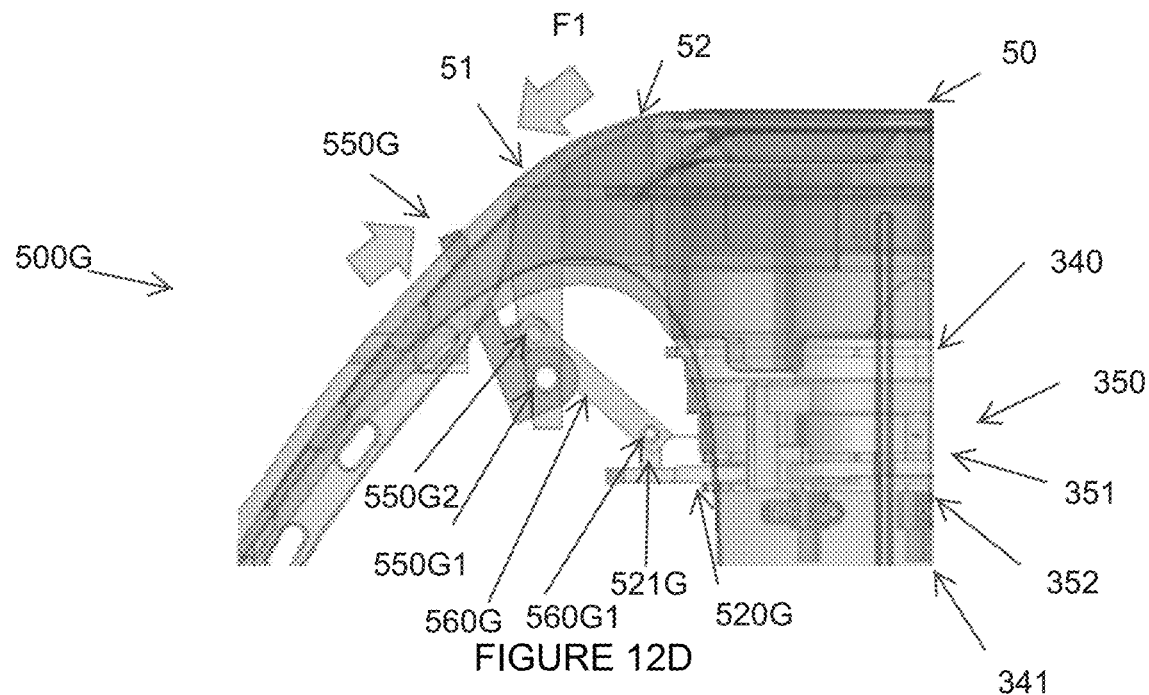
Figure 12E:
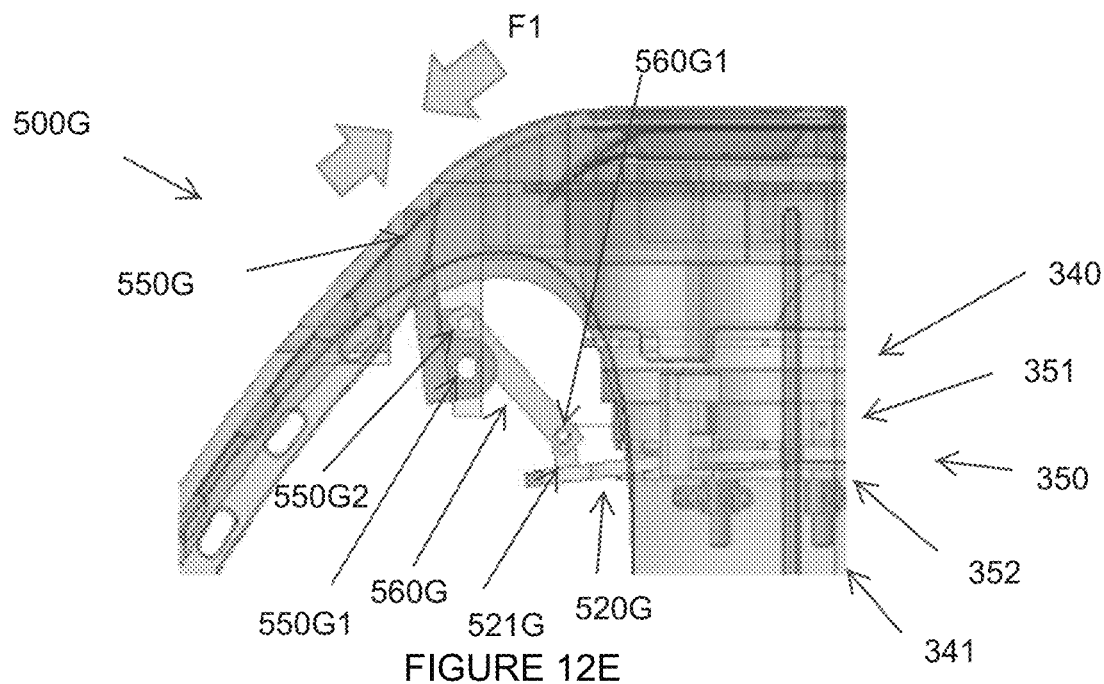

In operation, a user can press on the lever 550G relative to the surface 51 while having one or more fingers in the finger slot 51 to apply a force F1 on the torque arm 520G via the connector arm 560G and connector 521G to rotate the torque arm 520G via pivot joints 529G1 relative to the frame supports 529G. Rotation of the torque arm 520G rotates the spacers 527G (e.g., so that the rectangular profile of the spacer 527G is not coplanar with the surface of the first portion 351 or second portion 352 of the brake 350) to urge the first portion 351 (e.g., armature) and second portion 352 (e.g., friction disc) of the brake 350 apart, to thereby release (e.g., disengage) the brake 350 and allow the manual retraction (by a user) of the surgical tool 400 relative to the patient for the associated instrument drive assembly 300. As shown in FIGS. 12D-12E, the more the lever 550G is moved toward the surface 51, the more the torque arm 520G rotates, and therefore the more the first portion (e.g., armature) 351 of the brake 350 is separated from the second portion (e.g., friction disc) 352 of the brake 350. When the lever 550G is not depressed (e.g., when a user ceases to depress the lever 550G), the torque arm 520G is not rotated and remains in a home position (e.g., so that the rectangular profile of the spacer 527G is coplanar with the surface of the first portion 351 or second portion 352), the brake release mechanism 500G is not actuated, so that the brake 350 is engaged (e.g., if there is a loss of power or hardware/software malfunction). In one implementation, the brake release mechanism 500G can be spring loaded (e.g., via a spring between the lever 550G and the surface 51 and/or via a spring between the torque arm 520G and the frame supports 529G, such as torsion springs) so that the lever 550G and the torque arm 520G are biased toward a home position (see FIG. 12A-12B) where the brake 350 can engage.

As discussed previously, each instrument drive assembly 300 associated with each robotic tool (e.g., surgical robotic tool, surgical tool) 400 has an associated brake release mechanism 500G.

Figure 13A:
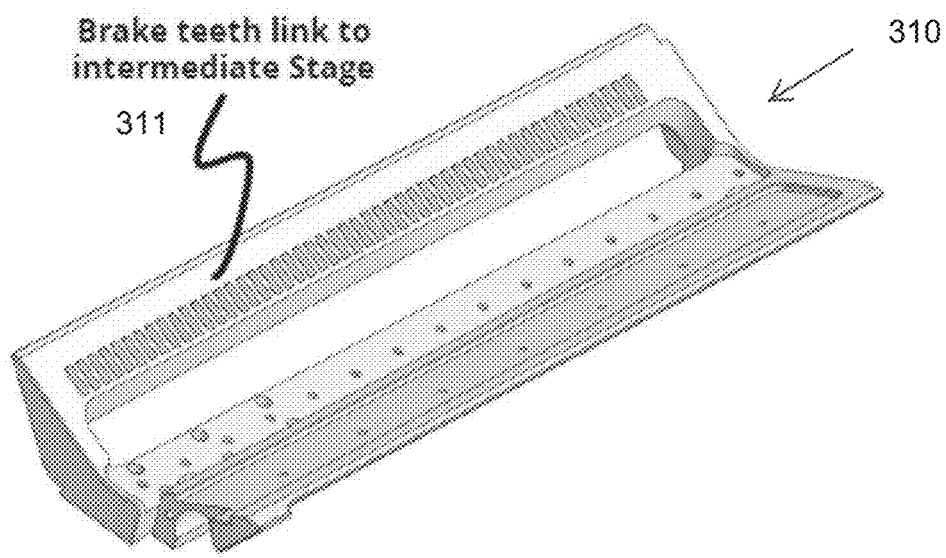
FIGS. 13A-13D show another example unpowered release mechanism for a robotic tool of the robotic surgical system.
Figure 13B:
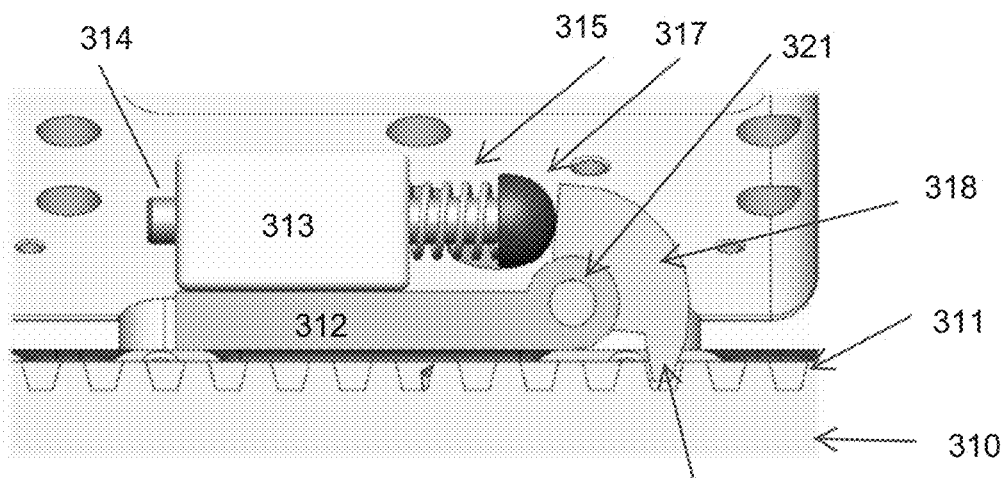
Figure 13C:
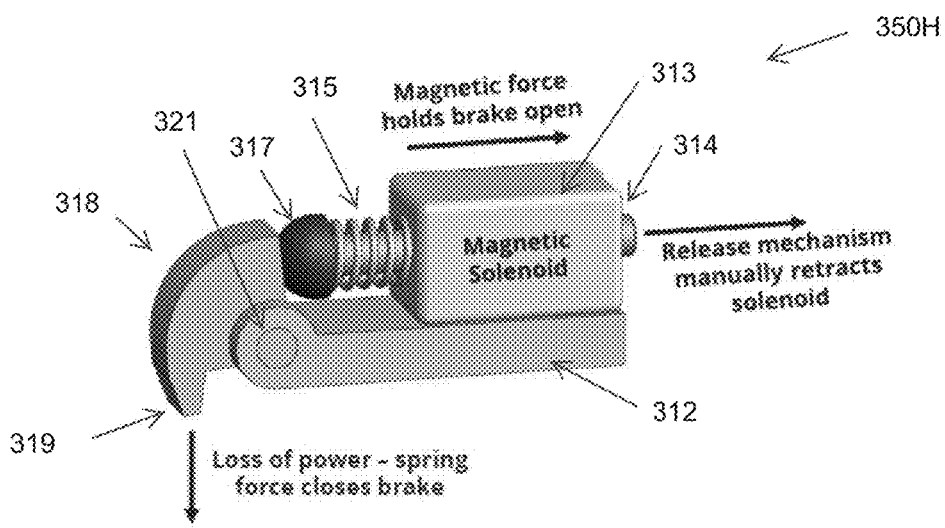

FIGS. 13A-13D show a brake release mechanism 500H for an instrument drive assembly 300 (described above) that is actuatable to manually (e.g., in an unpowered manner) retract a robotic tool (e.g., surgical robotic tool, surgical tool) 400, for example relative to a patient. FIG. 13A shows the intermediate link 310 of an instrument drive assembly 300 (see FIGS. 2-3A), the intermediate link having one or more (e.g., multiple, a plurality of) teeth 311 formed on a surface of the intermediate link 310.

The brake release mechanism 500H includes a brake release button 550H (or actuator) movably coupled to a housing of the instrument drive unit (IDU) 320 proximate the distal interface 325 of the IDU 320. In another implementation, the brake release button 550H or actuator can instead be a lever pivotally coupled to the housing of the IDU 320. The brake release button 550H is manually actuatable (e.g., can be manually pushed or depressed) by a user. The brake release button 550H (or actuator) is coupled to a rod or cable 560H, where pressing on the brake release button 550H applies a pull force on the rod or cable 560H. The rod or cable 560H is coupled to the brake 350H. The brake 350H includes a shaft 314 of a magnetic solenoid 313. A spring 315 is disposed about the shaft 314 and between the magnetic solenoid 313 and a bumper 317, the spring 315 biases the bumper 317 toward engagement with a cam 318 rotatably coupled to a support 312 via a joint 321, the cam 318 including a tooth 319. The cam 318 can optionally be spring-loaded (e.g., relative to the joint 321, such as via a torsion spring), to urge the cam 318 toward the bumper 317.

In operation, when the robotic surgical system 100 is operational (e.g., when not suffering from loss of power or hardware or software malfunction), the magnetic solenoid 313 is operated to apply a magnetic force on the shaft 314. The magnetic force on the shaft 314 moves the shaft 314 and therefore the bumper 317 away from the cam 318. Thus, the tooth 319 is inhibited (e.g., prevented) from engaging the teeth 311 on the intermediate link 310 and applying a braking force (e.g., the brake 350H is released or disengaged). When the robotic surgical system 100 loses power, the magnetic solenoid 313 is not able to apply such a force on the shaft 314 and the spring force from the spring 315 moves the bumper 317 toward the cam 318, causing the cam 318 to rotate about the joint 321 so that the tooth 319 engages the teeth 311 of the intermediate link 310 to apply a braking force between the IDU 320 and the intermediate link 310 (e.g., the brake 350H is engaged).

Figure 13D:
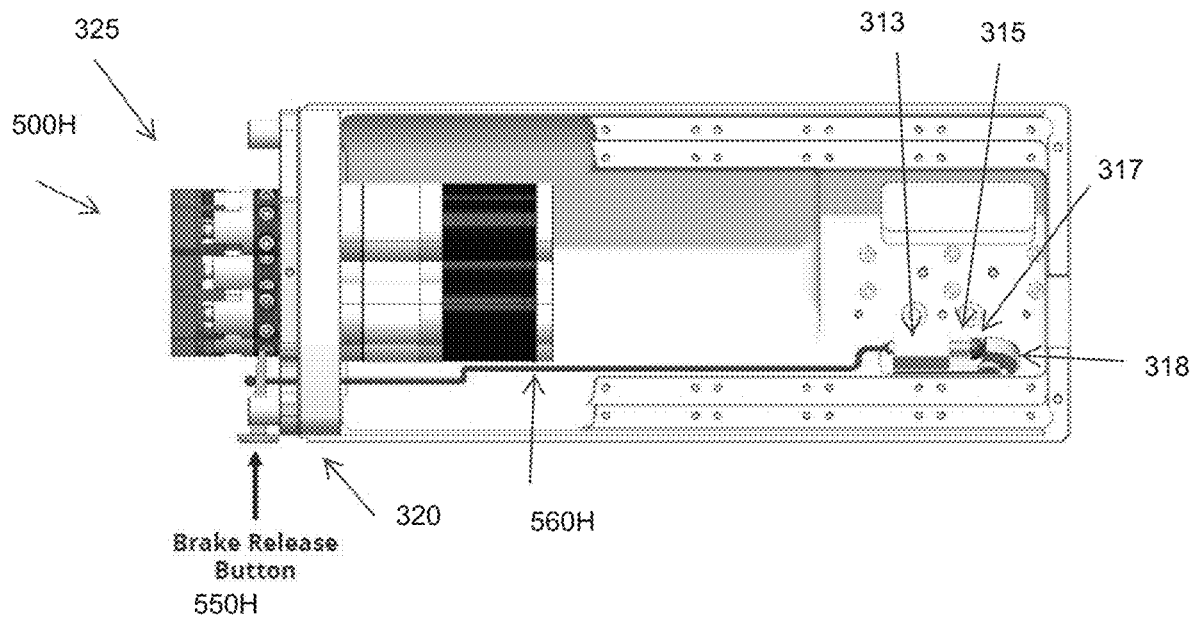

With reference to FIG. 13D, when the brake release button 550H (or actuator) is actuated (e.g. pressed, depressed), the brake release button 550H applies a force (e.g. a pulling force) on the rod or cable 560H, which in turn applies a force (e.g., a pulling force) on the shaft 314. Such a force moves the shaft 314 and therefore the bumper 317 away from the cam 318. Thus, the tooth 319 is disengaged or released from the teeth 311 on the intermediate link 310, thereby releasing the braking force between the IDU 320 and the intermediate link 310 (e.g., the brake 350H is released or disengaged) and allowing the robotic tool 400, IDU 320 and/or instrument drive assembly 300 to be retracted (e.g., by back driving a lead screw of the instrument drive assembly 300). Advantageously, the brake release mechanism 500H can be housed in the IDU 320. Additionally, the brake release button 550H located on a front or distal end of the IDU 320, advantageously allowing for one-handed brake release on a front of the IDU 320 (e.g., proximate the distal interface 325 of the IDU 320).

Figure 14A:
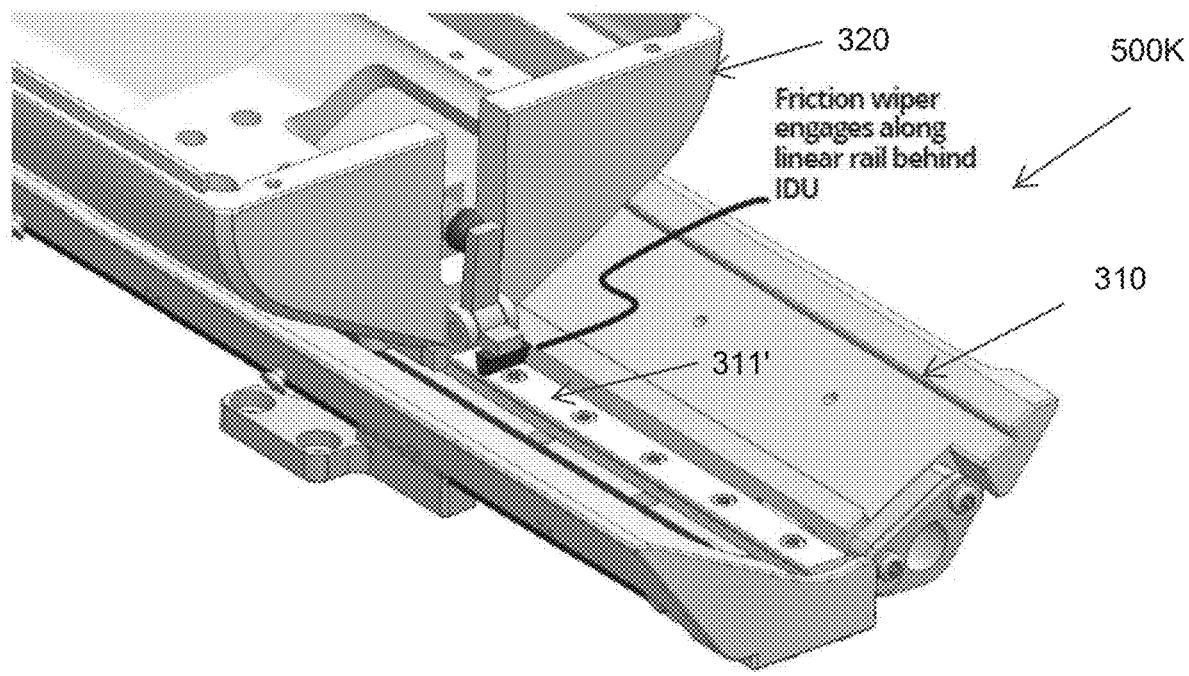
FIGS. 14A-14B show another example unpowered release mechanism for a robotic tool of the robotic surgical system.
Figure 14B:
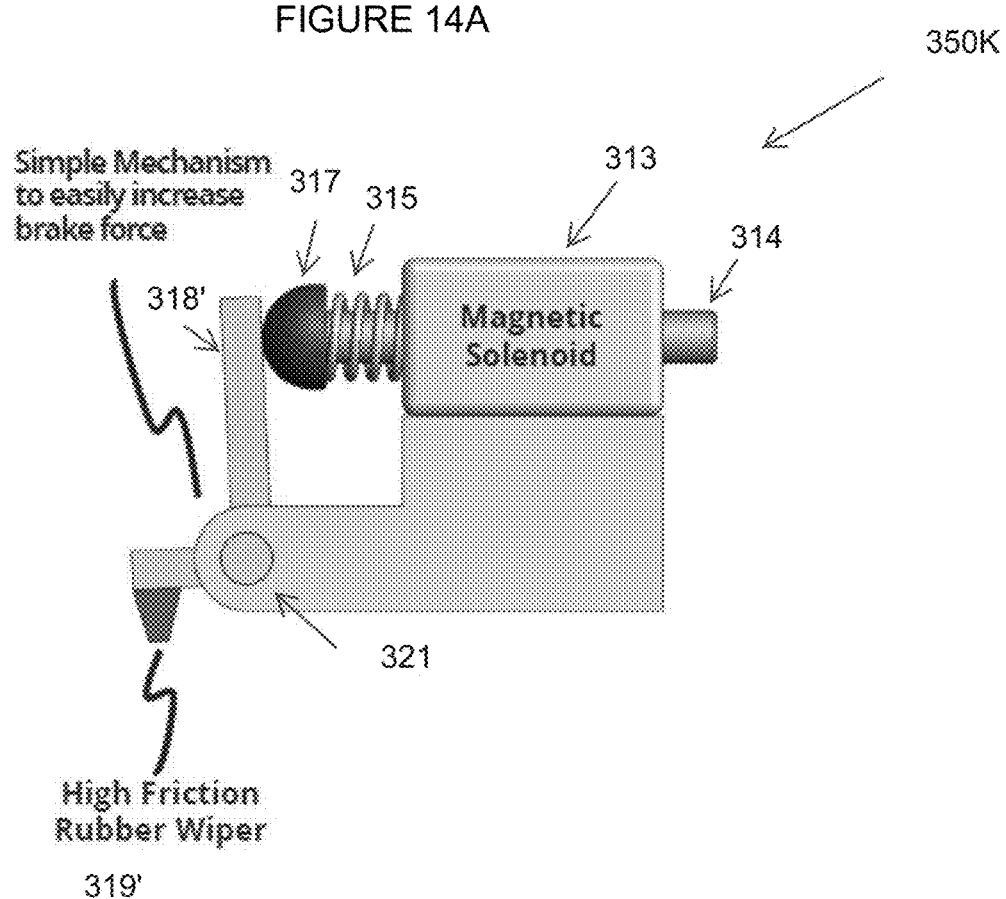

FIGS. 14A-14B show different views of a brake release mechanism 500K. Some of the features of the brake release mechanism 500K are similar to features of the brake release mechanism 500H in FIGS. 13A-13D. Thus, reference numerals used to designate the various components of the brake release mechanism 500K are identical to those used for identifying the corresponding components of the brake release mechanism 500H in FIGS. 13A-13D, except that a "K" instead of an "H" has been added to the numerical identifier. Therefore, the structure and description for the various features of the brake release mechanism 500H and how it's operated and controlled in FIGS. 13A-13D are understood to also apply to the corresponding features of the brake release mechanism 500K in FIGS. 14A-14B, except as described below.

The brake release mechanism 500K differs from the brake release mechanism 500H in that instead of a tooth 319, a wiper 319' (e.g. high friction rubber wiper) is attached to an end of the cam 318'. The wiper 319' frictionally engages a surface 311' on the intermediate link 310. Though not shown, the brake release mechanism 500K can have a brake release button (like the brake release button 550H) that engages a rod or cable (like the rod or cable 560H). The rod or cable can couple to an end of the shaft 314. The magnetic solenoid 313 can operate in the same way discussed above to apply a magnetic force on the shaft 314 to disengage the wiper 319' from the surface 311', and when power is lost the spring 315 forces the bumper 317 toward the cam 318' to rotate the cam 318' so that the wiper 319' engages the surface 311' (e.g., the brake 350H is engaged).

When the brake release button (or actuator) is actuated (e.g. pressed, depressed), the a force (e.g. a pulling force) is applied on the rod or cable, which in turn applies a force (e.g., a pulling force) on the shaft 314. Such a force moves the shaft 314 and therefore the bumper 317 away from the cam 318'. Thus, the wiper 319' is disengaged or released from the surface 311' on the intermediate link 310, thereby releasing the braking force between the IDU 320 and the intermediate link 310 (e.g., the brake 350K is released or disengaged) and allowing the robotic tool 400, IDU 320 and/or instrument drive assembly 300 to be retracted (e.g., by back driving a lead screw of the instrument drive assembly 300). Advantageously, the brake release mechanism 500K is housed in the IDU 320. Additionally, the brake release button located on a front or distal end of the IDU 320, advantageously allowing for one-handed brake release on a front of the IDU 320 (e.g., proximate the distal interface 325 of the IDU 320).

Figure 15A:
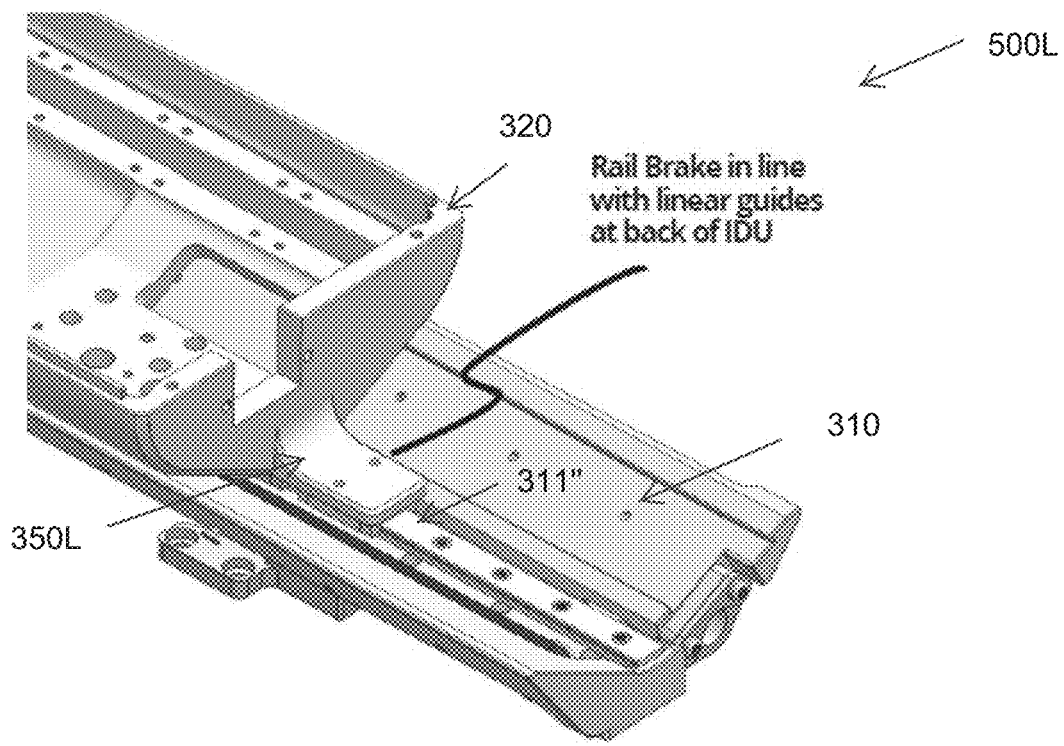
FIGS. 15A-15B show another example unpowered release mechanism for a robotic tool of the robotic surgical system.
Figure 15B:
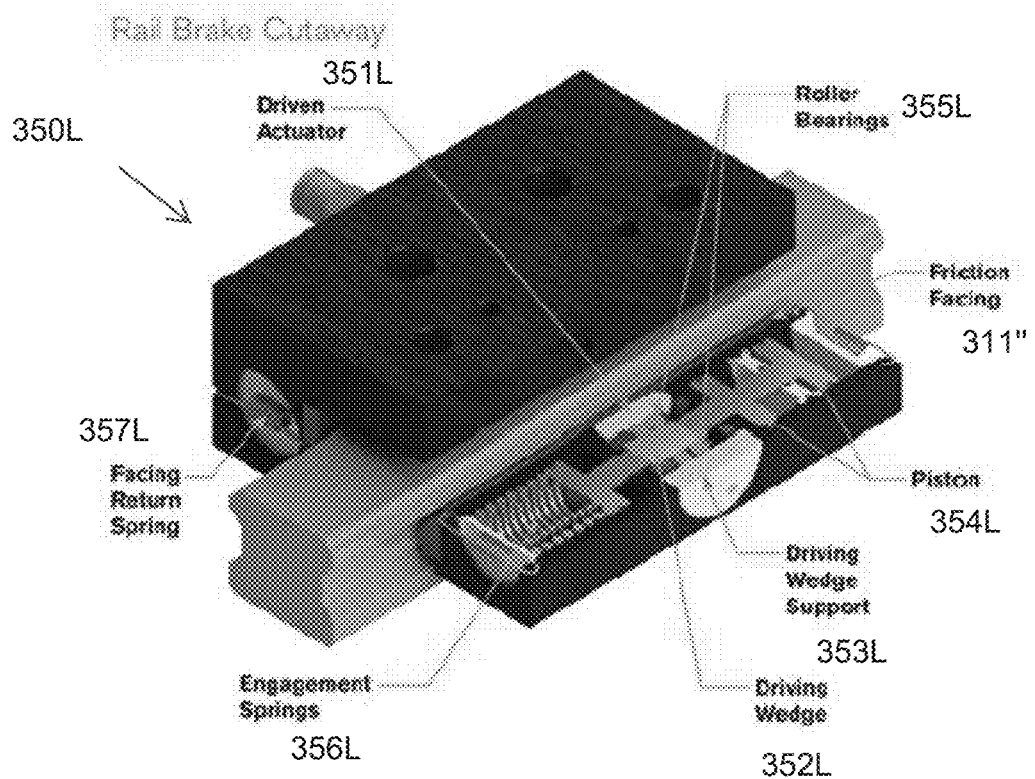

FIGS. 15A-15B show different views of a brake release mechanism 500L. Some of the features of the brake release mechanism 500L are similar to features of the brake release mechanism 500K in FIGS. 14A-14B. Thus, reference numerals used to designate the various components of the brake release mechanism 500L are identical to those used for identifying the corresponding components of the brake release mechanism 500K in FIGS. 14A-14B, except that an "L" instead of a "K" has been added to the numerical identifier. Therefore, the structure and description for the various features of the brake release mechanism 500K and how it's operated and controlled in FIGS. 14A-14B are understood to also apply to the corresponding features of the brake release mechanism 500L in FIGS. 15A-15B, except as described below.

The brake release mechanism 500L differs from the brake release mechanism 500K in that it is a rail brake that engaged both sides of a rail 311" of the intermediate link 310. The brake 350L can be attached to a portion of the IDU 320, as shown in FIG. 15A, and the brake release mechanism 500K can be housed in the IDU 320.

FIG. 15B shows a cutaway of the brake 350L and includes a driven actuator 351L, a driving wedge 352L, a driving wedge support 353L, pistons 354L, roller bearings 355L, engagement springs 356L and facing return springs 357L. The springs 356L, 357L engages friction members to engage sides of the rail 311".

In operation, the engagement springs 356L push on the piston 354L and wedges 532L, 353L to engage the friction members with the sides of the rail 311'. The brake release mechanism 550K can include a lever or button manually actuatable by a user to disengage the brake 350L from the rail 311", for example by applying pressure on the piston 354L to move it in the opposite direction to disengage the friction members away from the sides of the rail 311" and allow the robotic tool 400, IDU 320 and/or instrument drive assembly 300 to be retracted (e.g., by back driving a lead screw of the instrument drive assembly 300). In one implementation, the brake release mechanism 550K is a pneumatic system actuated by said lever or button to disengage the brake as discussed above.

Figure 16:
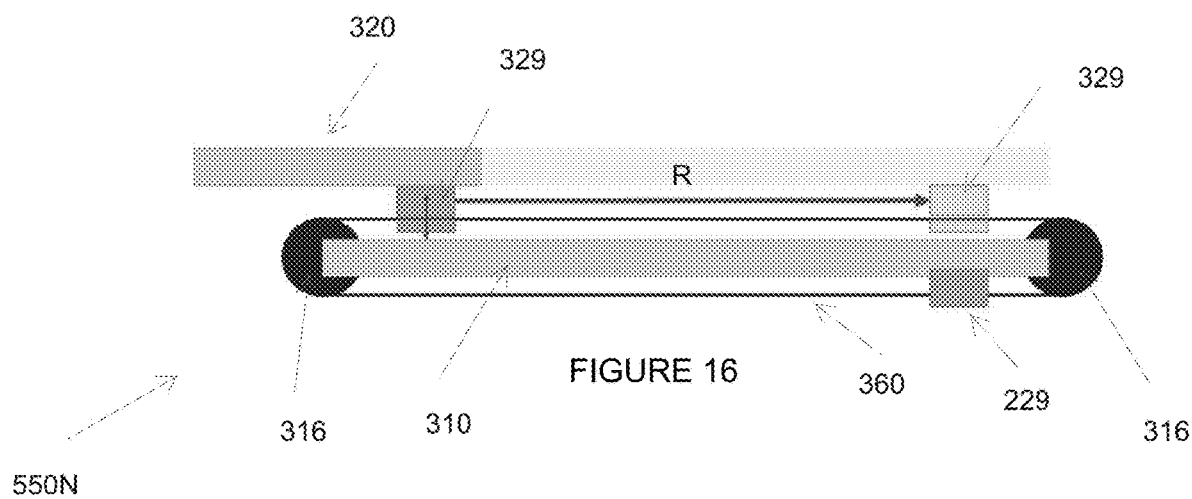
FIG. 16 shows another example unpowered release mechanism for a robotic tool of the robotic surgical system.

FIG. 16 schematically shows a brake release mechanism 550N for releasing a brake that acts between the IDU 320 and the intermediate link 310. The brake release mechanism 550N, when actuated, releases the clamp 329 that clamps the IDU 320 to the belt 360, allowing the IDU 320 to be retracted in direction R relative to the intermediate link 310 and toward the central drive unit 50.

Figure 17:
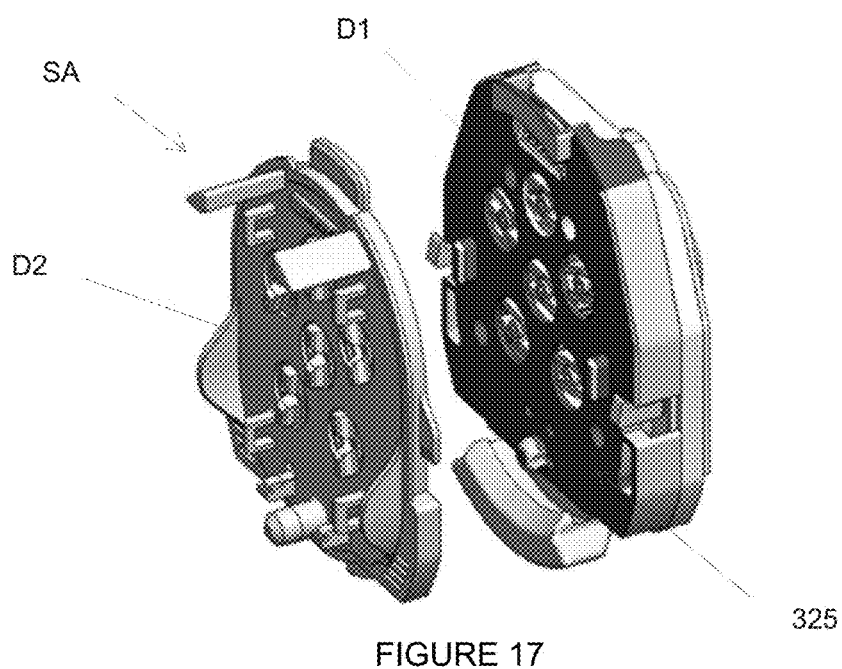
FIGS. 17-18 show another example unpowered release mechanism for a robotic tool of the robotic surgical system.
Figure 18:
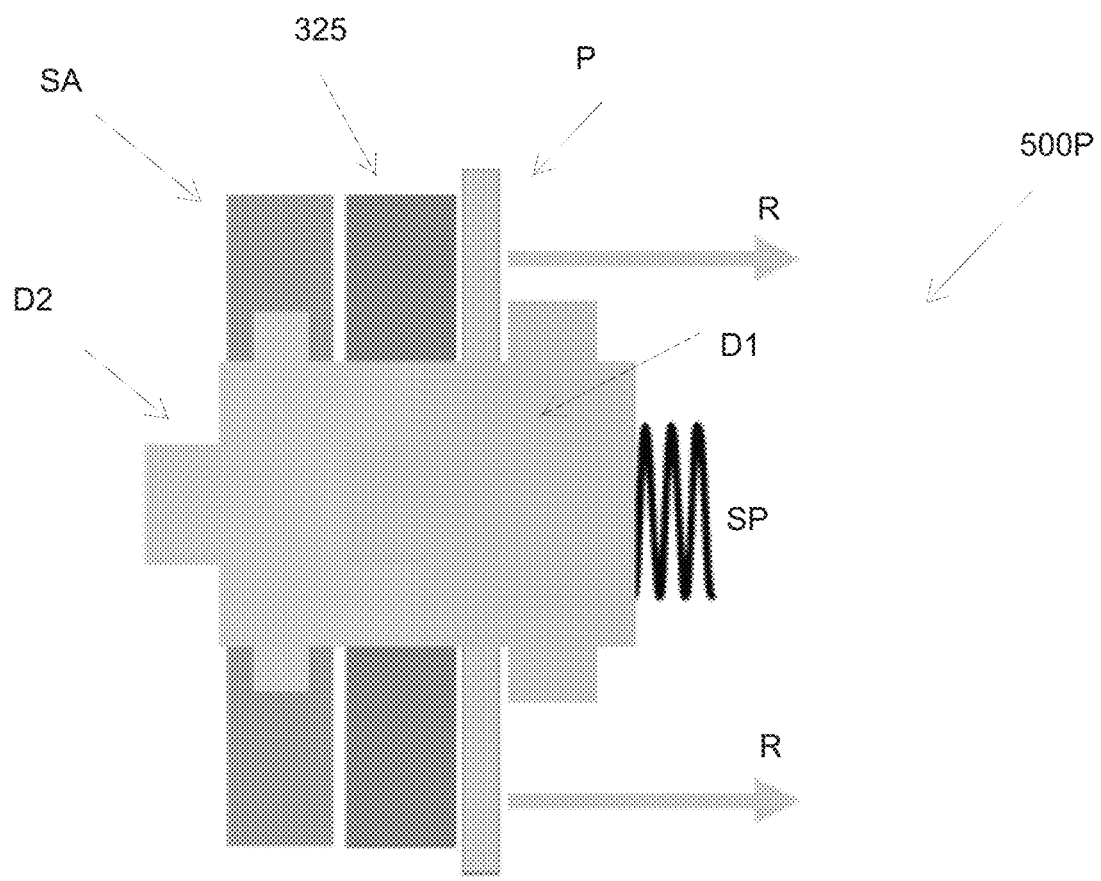

FIGS. 17-18 show a release mechanism 500P for disengaging the driven dogs D1 of the distal interface 325 of the IDU 320 from dogs D2 of a sterile adapter SA to allow the instrument 400 to be straightened while remaining coupled to the IDU 320 via the sterile adapter SA. The release mechanism 500P includes a plate P that receives a retraction force R (e.g., a pulling force via a lever or pull cable or rod as described herein). The retraction force R applied to the plate P causes the plate P to engage and retract the driven dogs D1 (which are spring loaded via spring SP) out of engagement with the dogs D2 of the sterile adapter. Once the dogs D1, D2 are disengaged, the tool 400 can be straightened (e.g., manually straightened), for example prior to removal of the tool 400 from the patient. The release mechanism 500P can be an unpowered (e.g., a manual) mechanism, and advantageously allows the straightening of the tools 400 even in the event of a loss of power or hardware or software malfunction.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the devices described herein need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed devices.

What is claimed is:

1. A robotic surgical system, comprising:
   a central drive unit configured to movably couple to a robotic arm, the central drive unit comprising:
   a linear spar attached to a mounting plate and extending distally from the mounting plate along a first axis, and
   a telescoping assembly movable relative to the linear spar, comprising
   an intermediate link movably coupled to the linear spar and configured to move linearly relative to the linear spar, the intermediate link being actuatable by a lead screw to extend distally relative to the linear spar, and
   an instrument drive unit movably coupled to the intermediate link and configured to move linearly relative to the intermediate link, the instrument drive unit configured to extend distally relative to the intermediate link, the instrument drive unit having a distal interface configured to removably couple to a robotic tool,
   wherein the telescoping assembly is actuatable between a collapsed configuration where the instrument drive unit is in a retracted position relative to the intermediate link and the intermediate link is in a retracted position relative to the linear spar and an extended configuration where the instrument drive unit is in an extended position relative to the intermediate link and the intermediate link is in an extended position relative to the linear spar;
   an electric motor operatively coupled to the lead screw and operable to rotate the lead screw to extend the intermediate link relative to the linear spar;
   a brake operable to inhibit rotation of the lead screw to lock a movement of one or more of the intermediate link and the instrument drive unit; and
   a manual brake release mechanism manually operable by a user to disengage the brake to allow manual retraction of the telescoping assembly to the collapsed configuration to manually retract the robotic tool.

2. The system of claim 1, wherein the lead screw is back-drivable.

3. The system of claim 1, wherein the brake comprises an armature and a friction disc, the armature configured to engage the friction disc to engage the brake.

4. The system of claim 3, wherein the brake release mechanism comprises a plate disposed between at least a portion of the armature and the friction disc, the plate linearly actuatable to separate the armature from the friction disc to disengage the brake to thereby allow the manual retraction of the telescoping assembly to the collapsed configuration to manually retract the robotic tool.

5. The system of claim 4, wherein the plate is actuatable by a lever pivotally or rotatably coupled to a housing of the central drive unit.

6. The system of claim 5, wherein the lever is configured to be pivoted away from the housing of the central drive unit to actuate the plate via one or more rods to separate the armature from the friction disc to disengage the brake.

7. The system of claim 5, wherein the lever is configured to be pivoted toward the housing of the central drive unit to actuate the plate via one or more rods to separate the armature from the friction disc to disengage the brake.

8. The system of claim 5, wherein the lever is configured to be rotated along a surface of the housing of the central drive unit to actuate the plate via one or more rods to separate the armature from the friction disc to disengage the brake.

9. The system of claim 4, further comprising means for separating the armature from the friction disc to disengage the brake.

10. The system of claim 3, wherein the brake release mechanism comprises a torque arm with a pair of spacers disposed between at least a portion of the armature and the friction disc, the pair of spacers having a rectangular profile with a greater width than height, the torque arm being pivotally actuatable about an axis between the spacers to separate the armature from the friction disc to disengage the brake to thereby allow the manual retraction of the telescoping assembly to the collapsed configuration to manually retract the robotic tool.

11. The system of claim 10, wherein the torque arm is pivoted via a lever pivotally coupled to a housing of the central drive unit, the lever coupled to the torque arm via a connector arm.

12. The system of claim 11, wherein the lever is configured to be pressed or pivoted toward the housing to pivot the torque arm to separate the armature from the friction disc to disengage the brake.

13. The system of claim 11, wherein the lever is configured to be pivoted away from a surface of the housing or pinched relative to a second surface of the housing to pivot the torque arm to separate the armature from the friction disc to disengage the brake.

14. The system of claim 10, further comprising means for separating the armature from the friction disc to disengage the brake.

15. The system of claim 1, wherein the manual brake release mechanism is at least housed in the instrument drive unit.

16. The system of claim 15, wherein the intermediate link has a plurality of teeth, and wherein the brake includes a magnetic solenoid with a shaft that engages rotatable cam with a tooth, the tooth selectively engaging one of the teeth of the intermediate link to lock the instrument drive unit relative to the intermediate link when the system experiences a loss of power.

17. The system of claim 16, wherein the brake release mechanism includes a brake release actuator manually actuatable by a user to apply a force on the shaft of the magnetic solenoid to retract the tooth from engagement with the teeth to disengage the brake and allow retraction of the instrument drive unit relative to the intermediate link to move the telescoping assembly to the collapsed configuration.

18. The system of claim 15, wherein the brake includes a magnetic solenoid with a shaft that engages rotatable cam with a wiper, the wiper selectively frictionally engaging a surface of the intermediate link to lock the instrument drive unit relative to the intermediate link when the system experiences a loss of power.

19. The system of claim 18, wherein the brake release mechanism includes a brake release actuator manually actuatable by a user to apply a force on the shaft of the magnetic solenoid to retract the wiper from engagement with the surface to disengage the brake and allow retraction of the instrument drive unit relative to the intermediate link to move the telescoping assembly to the collapsed configuration.

20. The system of claim 15, wherein the instrument drive unit comprises the brake that frictionally engages one of both sides of a rail of the intermediate, the brake release mechanism including a brake release actuator manually actuatable by a user to disengage the brake and allow retraction of the instrument drive unit relative to the intermediate link to move the telescoping assembly to the collapsed configuration.

21. The system of claim 1, wherein the lead screw has a ratcheted surface, and wherein the brake includes a magnetic solenoid with a shaft having a tooth that engages the ratcheted surface of the lead screw to lock a position of the telescoping assembly when the system experiences a loss of power.

22. The system of claim 21, wherein the brake release mechanism includes a brake release actuator manually actuatable by a user to apply a force on the shaft of the magnetic solenoid to retract the tooth from engagement with the ratcheted surface to disengage the brake and allow manual retraction of the telescoping assembly to the collapsed configuration.

23. The system of claim 1, further comprising a belt forming a closed loop belt extending over a pair of rollers attached to the intermediate link, a first portion of the belt fixedly coupled to a first clamp of the linear spar and a second portion of the belt fixedly coupled to a second clamp of the instrument drive unit, wherein movement of the intermediate link relative to the linear spar causes the belt to move about the pair of rollers, thereby causing the instrument drive unit to linearly move relative to the linear spar.

24. The system of claim 23, wherein the brake release mechanism is configured to release the second clamp from the belt to allow the instrument drive unit to move relative to the intermediate link.

25. The system of claim 1, further comprising a sterile adapter configured to removably couple to the distal interface of the instrument drive unit, one or more drive dogs at the distal interface configured to engage one or more driven dogs of the sterile adapter to transfer motion to a robotic tool coupled to the sterile adapter, a tool release mechanism including a plate linearly actuatable to separate the drive dogs from the driven dogs while the sterile adapter is coupled to the distal interface to decouple the drive dogs from the robotic tool to allow a manual straightening of the robotic tool.

* * * * *